US010013397B2

(12) United States Patent
Hassan et al.

(10) Patent No.: US 10,013,397 B2
(45) Date of Patent: *Jul. 3, 2018

(54) EMBEDDING DYNAMIC CONTENT ITEM PREVIEW

(71) Applicant: Dropbox, Inc., San Francisco, CA (US)

(72) Inventors: Ryhan Hassan, San Francisco, CA (US); Anthony DeVincenzi, San Francisco, CA (US); Steve Bartel, San Francisco, CA (US); Matthew Blackshaw, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/638,372

(22) Filed: Jun. 30, 2017

(65) Prior Publication Data

US 2017/0300458 A1    Oct. 19, 2017

Related U.S. Application Data

(63) Continuation of application No. 14/820,510, filed on Aug. 6, 2015, now Pat. No. 9,767,078.

(51) Int. Cl.
*G06F 17/00* (2006.01)
*G06F 17/21* (2006.01)
*G06F 17/22* (2006.01)
*G06Q 10/10* (2012.01)
*G06F 17/30* (2006.01)

(52) U.S. Cl.
CPC ........ *G06F 17/212* (2013.01); *G06F 17/2205* (2013.01); *G06F 17/3089* (2013.01); *G06Q 10/10* (2013.01)

(58) Field of Classification Search
None
See application file for complete search history.

(56) References Cited

U.S. PATENT DOCUMENTS

| 7,596,766 | B1 | 9/2009 | Sharma |
| 8,549,434 | B2 | 10/2013 | Ouzts et al. |
| 2004/0205504 | A1 | 10/2004 | Phillips |

(Continued)

OTHER PUBLICATIONS

Google Apps for Word Press, Google Drive Embedder, Nov. 10, 2014, youtube, pp. 1-8, Retrieved: https://www.youtube.com/watch?v=wcpjcFJIOko.

(Continued)

*Primary Examiner* — Howard Cortes
(74) *Attorney, Agent, or Firm* — Fenwick & West LLP

(57) ABSTRACT

A content management system including a document management system provides documents that include previews of folders in the content management system. The folder preview interface saved in the document is persistent despite changes to the folders stored by the content management system. In addition, previews of individual content items displayed within the folder preview interfaces are synchronized with the corresponding content items on the content management system. In some embodiments, the document may include other types of media including text, images, tables, video, etc. in addition to any embedded preview interfaces. Folder previews may also display previews of subfolders within the folder. A subfolder preview may display a list of content items within the subfolder. A user may also arrange multiple folder preview regions within the same document.

20 Claims, 23 Drawing Sheets

(56) References Cited

U.S. PATENT DOCUMENTS

| | | |
|---|---|---|
| 2007/0061745 A1 | 3/2007 | Anthony et al. |
| 2008/0129757 A1 | 6/2008 | Tanaka et al. |
| 2009/0307622 A1 | 12/2009 | Jalon et al. |
| 2010/0050114 A1 | 2/2010 | Braun et al. |
| 2010/0251085 A1 | 9/2010 | Zearing et al. |
| 2013/0002796 A1 | 1/2013 | Hiller et al. |
| 2013/0042201 A1 | 2/2013 | Sandman et al. |
| 2013/0339830 A1 | 12/2013 | Yuan et al. |
| 2015/0095839 A1 | 4/2015 | Hombert |

OTHER PUBLICATIONS

Why the Folder Gadget Beats Attachments in Google Sites; Jonathan Wylie, Feb. 16, 2014; Jonathan Wylie: Instructional Technology Consultant, pp. 1-4; http://jonathanwylie.com/2014/02/16/why-the-folder-gadget-beats-attachments-in-googlesites/.

Embedded Drive Folders, No Author, Aug. 21, 2013; pp. 1-5. https://web.archive.org/web/20130821033849/https://sandbox.atwoodphoto.com/embeddeddrivefolders.

Jay Altwood, Embed Drive Folders Into your Google Sites, Uploaded Mar. 19, 2013, pp. 1-13, htttps://www.youtube.com/watch?v=SDqP4FKoT8I.

United States Office Action, U.S. Appl. No. 14/820,510, dated Aug. 25, 2016, 36 pages.

United States Office Action, U.S. Appl. No. 14/820,510, dated Feb. 26, 2016, 34 pages.

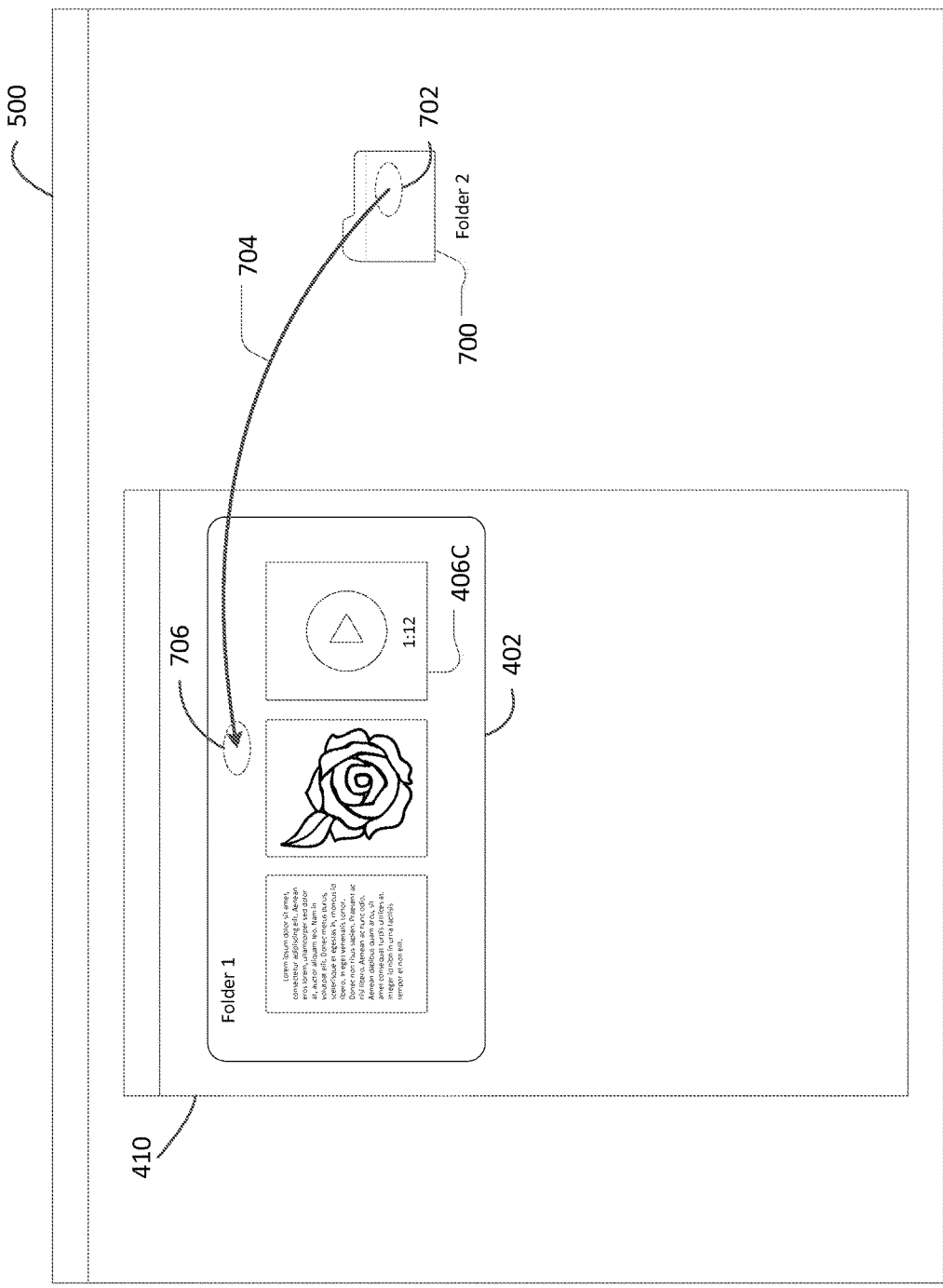

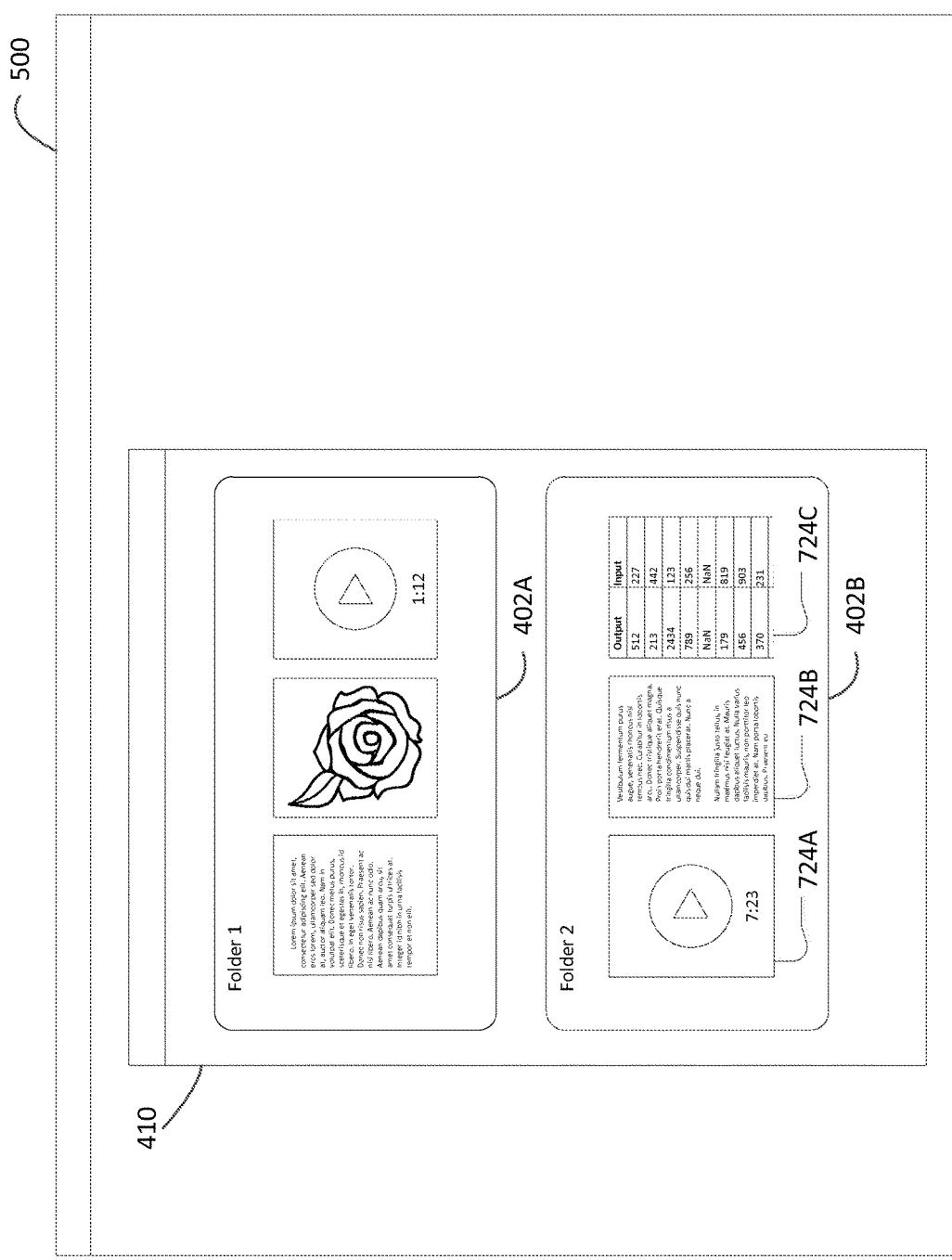

EMBEDDING DYNAMIC CONTENT ITEM PREVIEW

CROSS REFERENCE TO RELATED APPLICATIONS

This application is a continuation of U.S. application Ser. No. 14/820,510, filed Aug. 6, 2015, now U.S. Pat. No. 9,767,078, which is incorporated by reference in its entirety.

TECHNICAL FIELD

The disclosed embodiments generally relate to generating previews of content items stored in a content management system. In particular, the disclosed embodiments relate to embedding dynamic previews of content items in documents.

BACKGROUND

Computer implemented collaborative sharing of content items is typically provided by a network-based content sharing computer system that allows multiple users to access and edit the content items. Generally, content items are created and edited by a specific type of native application, such as a word processor or spreadsheet application. A document or spreadsheet can contain content items such as text, graphic objects, and hyperlinks, but cannot contain or display hierarchical structures such as folders or directories. When content items are shared or uploaded to a content sharing system there is little flexibility in how the shared content items can be viewed and the user is typically restricted to using a traditional file listing view or a list of file icons to browse through content items in shared folders.

SUMMARY

A content management system allows users to create, edit and share content items among a plurality of other users. Users communicate with the content management system using a client application on a client device. Each user of the content management system has a user identifier, such as a unique ID number, a user name, or email address. The client application provides an interface for the user to access content items on the content management system, edit such content items, provide comments on the content item and share content items with other users.

A content management system enables users to create folder previews that represent folders and their contents in the content management system, and embed them directly in a document for later viewing and access. A folder preview interface (or simply "folder preview") is embedded in a document and automatically synchronized with changes to the folders stored by the content management system, such as the addition or deletion of items in the folder. In addition, previews of individual content items displayed within the folder previews are synchronized with the corresponding content items on the content management system. In some embodiments, the document may include other types of media including text, images, tables, video, etc. in addition to any embedded preview interfaces. By embedding folders into a rich document of other media, coordination between users of the content management system on shared projects is improved through simplified integration of at least text, content items, and folders in a single document. A user may create a rich document in a second client application used exclusively for that purpose, or a user may create a document in an extension of the original client application. In either case, this second application or application extension will be referred to herein as a preview application.

A folder preview may be created by clicking and dragging or using another similar set of commands to move or insert a folder into a document. Upon release of the folder over the preview application window of a document, the preview application determines whether the folder is saved on the content management system. If the folder is not saved on the content management system the client application may provide interfaces for the user to choose a location to save the folder within the content management system. Alternatively, the preview application may save the folder in a location associated with the location of the document in which the folder was placed. In some embodiments, the folder may only need to be saved locally to provide previews to the document and so is not saved to the content management system. In this case, the preview application determines the location of the folder in the file system of the client device.

After saving the folder to the content management system, determining that the folder is already saved on the content management system, or determining the location of the folder in the file system of the client device, the preview application generates previews for content items within the folder. The preview application may generate previews for all content items within the folder or only a subset of content items within the folder. A preview of a content item may display the entire content item or may only display portion of the content item. In addition, a preview of a content item may be interactive, for example, if a user inputs a scrolling command over the preview of a content item, the preview application may scroll through the content item. In the case of a video file, the preview application may play the video file upon receiving an interaction from the user on the preview of the video file.

A single folder preview functions to display a subset of the contents of the folder that can fit within the window of the preview application or within a designated preview region of the folder preview interface. For example, a folder preview interface may be sized to have sufficient area to display previews for only three files at a time. A first group of files is then shown in the folder preview region by the preview application. Upon receiving a scrolling gesture, the preview application scrolls some of the displayed previews out of the folder preview region such that they fade out or disappear from view and displays other generated previews of content items within the previewed folder into the preview region.

In some embodiments, a user may modify the shape or size of a preview region, for example by clicking and dragging or using a similar gesture on a corner of the folder preview region and adjusting the size of the region. When the user increases the size of the folder preview region the spacing between previews, the number of previews in a row, or the number of preview rows may increase accordingly. When the user decreases the size of the preview region the spacing between previews, the number of previews, or the number of preview rows may decrease.

If the preview region is large enough for multiple rows of previews, the previews from the first row may move down to a second row upon the preview application receiving a scrolling command within the preview region. Alternatively, both rows may scroll in the same direction without moving previews between rows.

Folder previews may also display previews of subfolders within the folder. A subfolder preview may display a list of content items within the subfolder. The list of subfolder or sub-hierarchical content items is displayed at the same size as a preview of any other content item. The subfolder preview may also contain icons or small previews of the content items within the subfolder. The subfolder preview may also be scrollable in a direction perpendicular to the normal scrolling direction in the preview region.

A user may also arrange multiple folder preview regions within the same document. The default position of an additional folder preview region may be below the first folder preview region. However, if a user drags and holds a folder in a position adjacent to a previously existing folder preview region the previously existing folder preview region may change size and shape to accommodate the placement of the new folder preview. The spacing of preview regions is determined by the value of an inside buffer and a margin buffer. The inside buffer is the value determining the amount of space between folder preview regions and the margin buffer is a value determining the amount of space between the side of a folder preview region and the margin of the document (or the side of the application window if there are no margins in the document). The margin and inside buffers may be adjusted by the user or preset by the preview application.

All of the aforementioned embodiments may be implemented with a local file system instead of a content management system. The present invention has embodiments in a client device and client application, a document management system, and computer program products, and computer implemented methods.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIGS. 7A-7F illustrate user interface elements of a process for creating a subfolder preview in accordance with one embodiment.

FIGS. 8A-8F illustrate user interface elements for adding a folder preview to a document with a pre-existing folder preview region in accordance with one embodiment.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
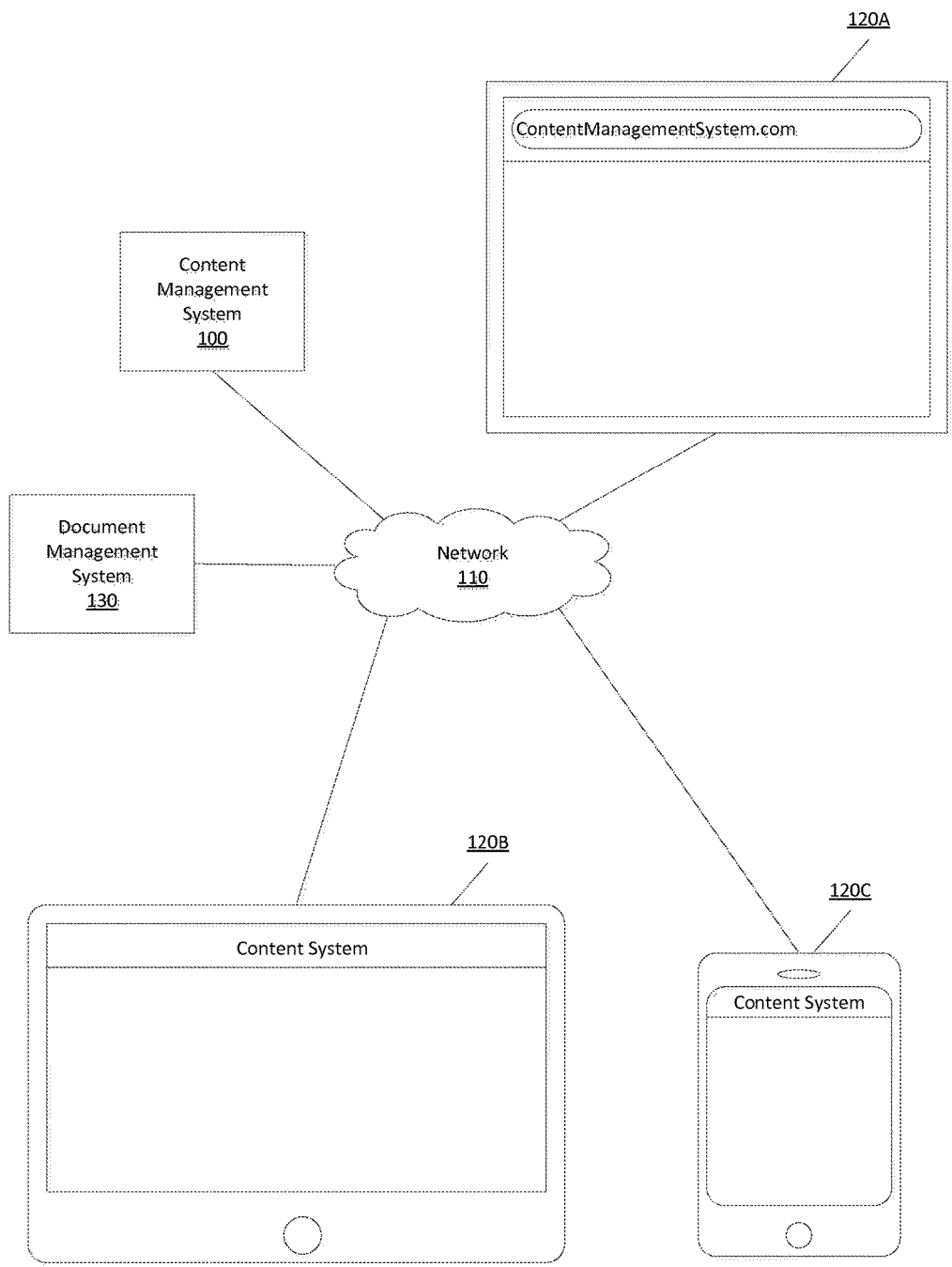
FIG. 1 shows a diagram of a system environment of a content management system and a document management system according to one embodiment.

FIG. 1 shows a system environment including content management system 100, document management system 130 and client devices 120A, 120B, 120C (collectively or individually "120"). Content management system 100 provides content sharing, synchronization for users of client devices 120. These services allow users to share content with other users of client devices 120. In addition to content sharing, content management system 100 updates shared content responsive to changes and enables users to synchronize changes in content across multiple client devices 120. A user may synchronize content across multiple client devices 120 owned by the user and associated with the user's account, and the user may share content that is synchronized with devices associated with other users' accounts. The content stored by content management system 100 can include any type of data, such as digital data, documents, media (e.g., images, photos, videos, audio, streaming content), data files and databases, source and object code, recordings, and any other type of data or file. The content stored by content management system 100 may be organized in one configuration in folders, tables, or in other database structures (e.g., object-oriented, key/value etc.). In one embodiment, the content shared by content management system 100 includes content created by using third party applications, e.g., word processors, video and image editors, database management systems, spreadsheet applications, code editors, and so forth, which are independent of content management system 100.

Users may create accounts at content management system 100 and store content thereon by transmitting such content from client device 120 to content management system 100. The content provided by users is associated with user accounts that may have various privileges. The privileges may include viewing the content item, modifying the content item, modifying user privileges related to the content item, and deleting the content item.

Document management system 130 provides users of client devices 120 with the ability to create, store, access, and share documents. Documents are computer files that a user can create using a documents editor, such as a document editor which can be hosted by the document management system 130, or a document editor 270 provided on client device 120.

Client Device

Figure 2:
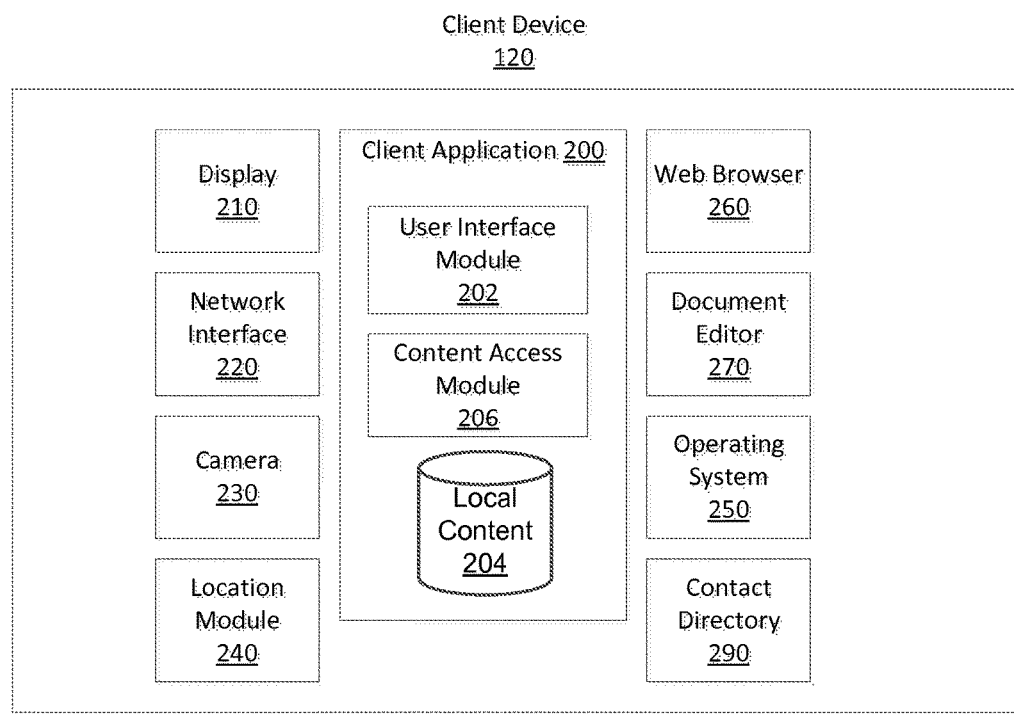
FIG. 2 shows a block diagram of the components of a client device.

FIG. 2 shows a block diagram of the components of a client device 120 according to one embodiment. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. Other components of a client device 120 that are not material are not shown, for example, one or more computer processors, local fixed memory (RAM and ROM), as well as optionally removable memory (e.g., SD-card), power sources, and audio-video outputs.

Client devices 120 maintain various types of components and modules for operating the client device and accessing content management system 100. The software modules include operating system 250 and optionally a document editor 270. Document editor 270 is configured for creating, viewing and modifying documents such as text documents, code files, mixed media files (e.g., text and graphics), presentations or the like. Operating system 250 on each device provides a local file management system and executes the various software modules such as content management system client application 200 and document editor 270. A contact directory 290 stores information on the user's contacts, such as name, telephone numbers, company, email addresses, physical address, website URLs, and the like.

Client devices 120 communicate with content management system 100 and document management system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Client devices 120 access content management system 100 and document management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at content management system is represented as a local file structure by operating system 250 in conjunction with client application 200.

Client application 200 manages access to content management system 100 and document management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as document editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Content Management System

Figure 3:
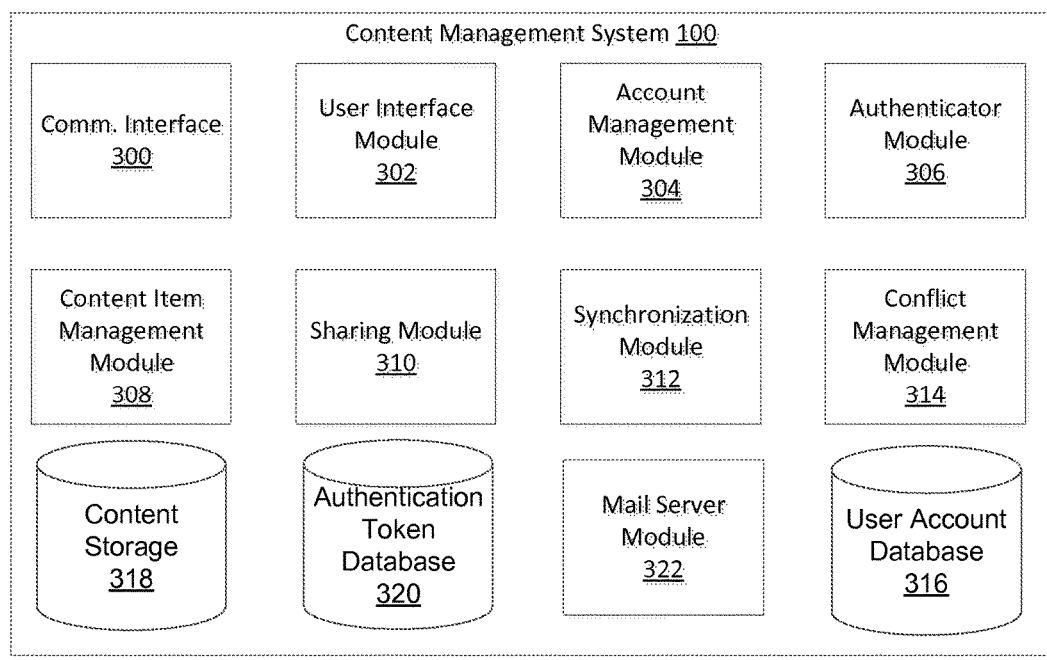
FIG. 3 shows a block diagram of the content management system.

FIG. 3 shows a block diagram of the content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile can be a username and/or email address. However, content management system 100 can also be configured to accept additional user information, such as password recovery information, demographics information, payment information, and other details. Each user is associated with a userID and a user name. For purposes of convenience, references herein to information such as documents or other data being "associated" with a user are understood to mean an association between a document and either of the above forms of user identifier for the user. Similarly, data processing operations on documents and users are understood to be operations performed on corresponding identifiers such as documentID and userIDs. For example, a user may be associated with a document by storing the information linking the userID and the documentID in a table, file, or other storage formats. For example, a database table organized by documentIDs can include a column listing the userID of each user associated with the document. As another example, for each userID, a file can list a set of documentIDs associated with the user. As another example, a single file can list key value pairs such as <userID, documentID> representing the association between an individual user and a document. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content, such as documents, audio files, video files, etc., from one or more client devices associated with the account. The content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 stores a single copy and then use a pointer or other mechanism to link the duplicates to the single copy. Similarly, content storage 318 stores files using a file version control mechanism that tracks changes to files, different versions of files (such as a diverging version tree), and a change history. The change history includes a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its subfolders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a website.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

Content management system 100 includes a sharing module 610 for sharing content publicly or privately, which is one means for performing this function. Sharing content publicly can include making the content item accessible from any computing device in network communication with content management system 100. Sharing content privately can include linking a content item in content storage 318 with two or more user accounts so that each user account has access to the content item. The content can also be shared across varying types of user accounts.

In some embodiments, content management system 100 includes a content management module 608 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

To share a content item privately, sharing module 610 adds a user account identifier to the content entry associated with the content item, thus granting the added user account access to the content item. Sharing module 610 can also be configured to remove user account identifiers from a content entry to restrict a user account's access to the content item.

To share content publicly, sharing module 610 generates a custom network address, such as a URL, which allows any web browser to access the content in content management system 100 without any authentication. The sharing module 610 includes content identification data in the generated URL, which can later be used by content management system 100 to identify properly and return the requested content item. For example, sharing module 610 can be configured to include the user account identifier and the content path in the generated URL. The content identification data included in the URL can be transmitted to content management system 100 by a client device to access the content item. In addition to generating the URL, sharing module 610 can also be configured to record that a URL to the content item has been created. In some embodiments, the content entry associated with a content item can include a URL flag indicating whether a URL to the content item has been created.

Preview Application

The preview application may be a stand alone application or it may be an extension of the client application on the client device. Additionally, the preview application may be accessed from a web browser and may over the same network and servers and database servers as the content management system. The preview application provides user interface elements and creates documents A document functions as both a text document and a means for previewing and accessing content items and folders on the content management system. A document may have aspects of a word processing document (e.g., contains and displays formatted text and graphics) and aspects of a folder or directory in a file management system (contains and displays groups of items, including subfolders). By having both text and other media (e.g. images, tables, charts, etc.) the document allows for enhanced collaboration and content item management since multiple users can access and edit the document. A document may provide previews for individual content items or a whole folder. A document further can contain folders and content items stored either on the content management system or on client devices. When a content item is added to a document the preview application creates a preview. Likewise, when a folder is added to a document the preview application creates a folder preview. A preview saved in the document is persistently maintained and synchronized with changes to the content item or folder stored by the content management system. For example, if content items are removed from the folder or added to the folder at the content management system, the preview of the folder is updated in the document. Previews of individual content items displayed within the folder preview interfaces are synchronized with the corresponding content items on the content management system or on the local client device. The preview application may also be used to view the document when the client device is not connected to the content management system, when this is the case the document displays the most recent version of the preview that was synchronized with the content management system.

Figure 4A:
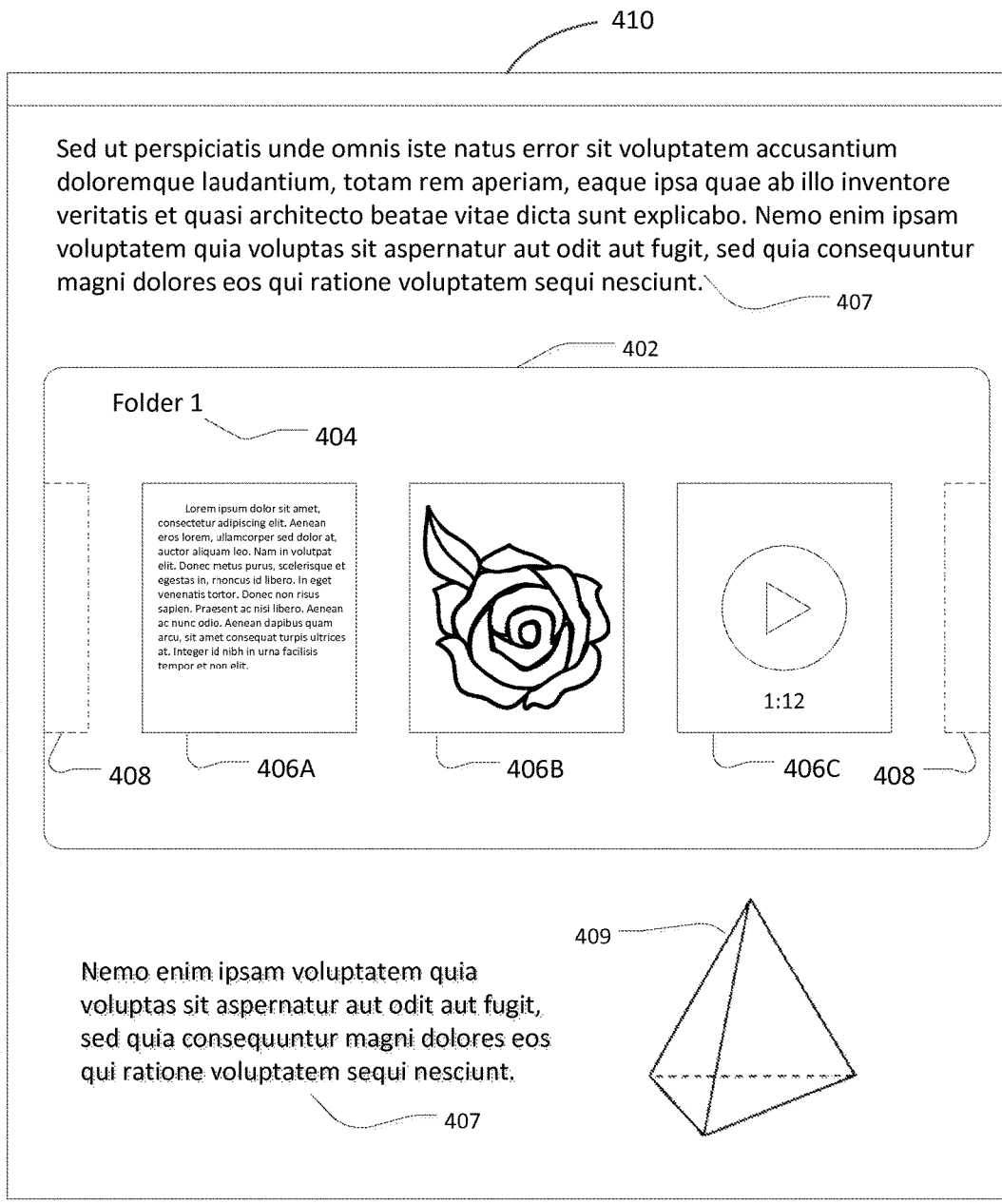
FIGS. 4A-4D illustrate user interface elements of a folder preview in accordance with one embodiment.

FIG. 4A illustrates features of a folder preview interface in a document in accordance with one embodiment. A folder preview interface (or simply, folder preview) is comprised of a folder preview region 402, a folder name 404, content item previews 406, scroll-in locations 408 in a document 410.

The document 410 is a window generated by the preview application and provides interfaces for editing the document (not shown). The size of the window 410 may be used by the preview application, in conjunction with other variables, to determine how large the preview region 402 is and how many previews 406 can fit inside. Alternatively the size of a preview may be determined by the type of preview, the number of content items in a folder (in the case of a folder preview), or the size of a preview may be fixed at a predetermined size or a size set by the user.

A folder preview region 402, also referred to herein as a "preview region," is the region designated for the folder preview in a document 410. In some embodiments, the preview region 402 is delineated by a faint boundary outline or some other visual indication, separating the preview region 402 from the content in the document, such as text 407 and graphics 409. In other embodiments, there is no visible outline. All other features of the folder preview reside within the preview region 402 and, in some embodiments, text 407 and other media not included in the preview may be excluded from the preview region 402.

The folder name 404 is the name of the folder represented by the folder preview, as maintained by the underlying file system or content management system 100. The folder name 404 may be continuously displayed at a designated location in the preview region 402; in one embodiment the user can set the formatting of the folder name in the same manner as the formatting of any other text of the document, including font, size, and justification (left, center, or right). Alternatively, the folder name 404 may not be persistently displayed in the interface but may only appear when the cursor hovers over the preview region 402 or a particular area in the preview region 402 corresponding to the location of the folder name 404. In some embodiments, the folder name 404 may act as a direct link to the folder on the content management system or the local file system of the client device, where a selection of the folder name 404 causes the content management system to open the folder in the file system of the client device or in a browser of the client device using the URL associated with the folder.

The content item previews 406, also referred to herein as "previews," are visual presentations of content items previewed individually or within a folder represented by the folder preview. Previews 406 may be generated for any type of content item including but not limited to text documents, images, video files, spreadsheets, or any other types of files stored by the content management system. Previews are renderings, by the preview application, of the content items they represent. For example, the preview of a text document is a rendering of the text within the text document. The previews 406 may be updated upon the user opening the document or they may be updated periodically while the document is open. Typically the preview application updates all previews in a preview folder whether or not they are currently visible in the preview region 402. By maintaining all previews 406 in the folder, the preview application enables immediate display of previews 406 during scrolling in the preview region 402, which will be explained in more detail in a later section.

The previews 406 may also be interactive. In some embodiments, a click (or touch if the client device is a touch screen device) on a preview 406 will cause the preview application to request that the content management system open the content item associated with the preview 406 or will open the content item directly if the preview application determines that a current copy of the content item is located on the client device. Alternatively, an interaction with the preview 406 may cause the content management system or the file system of the client device to navigate to the location of the content item associated with the preview 406 without actually opening the content item. In some embodiments, the previews 406 are configured to receive additional interactions specific to the type of content item they represent. For example, a text document preview 406 may be configured to receive a scrolling gesture to display additional text not originally shown in the preview 406. On the other hand a preview 406 representing a video file may be configured to play the video (possibly at a lower resolution) or a clip of the video responsive to receiving an input from a user.

The preview application may request authorization from the authenticator module 306 of the content management system to ensure that the user viewing the document has access to the folder in the folder preview region 402. If the viewing user is determined to have access to the folder the preview application displays the preview, if the viewing user does not have access to the folder the preview is not displayed and instead an icon indicating the lack of authorization may be displayed. Alternatively, the user may be denied access to the document as a whole if access is not granted by the authenticator module 306.

In the illustration of FIG. 4A preview region 402 for Folder 1 contains the previews 406 for three example content items. The first preview 406 is a text document preview 406A, the second preview 406 is an image file preview 406B, and the third preview 406 is a video file preview 406C. As described above many other types of content items are represented by preview 406.

Document 410 can be scrolled in both vertical and horizontal directions, with different results. In one embodiment, a vertical scrolling input scrolls through the contents of the document 410 within the document's window, while horizontal scrolling inputs scroll the previews 406 in the preview region 402, without scrolling the document contents including text 407, images 409, or other media. Referring again to FIG. 4A, scroll-in locations 408 are locations in the preview region 402 from which additional previews 406 originate when the preview application receives a command to scroll within the preview region 402. In another embodiment, scrolling commands inside the preview region 402 result in scrolling in the preview region 402 only, whereas scrolling commands that occur outside of the preview region 402 scroll the contents of the document 410. This allows a user uninterrupted scrolling in the document while passing over a folder preview while also enabling the user to scroll through document previews without opening the previewed folder itself.

When a new preview 406 is scrolled into the preview region 402 from one end of a row of previews 406 in of the preview region 402, one of the displayed previews 406 at the opposite end of the same row is translated horizontally in the same direction and fades out of the opposite side of the preview region 402. In some embodiments, the edges of previews 406 are left visible (either partially, and/or transparently) in the positions indicated by the dotted lines marked as 408 in FIG. 4A in order to convey an indication that additional previews 406 are present in the folder. When a scrolling command is received the partially displayed or partially transparent previews at the scroll-in locations 408 move completely into the preview region and become fully opaque.

Figure 4B:
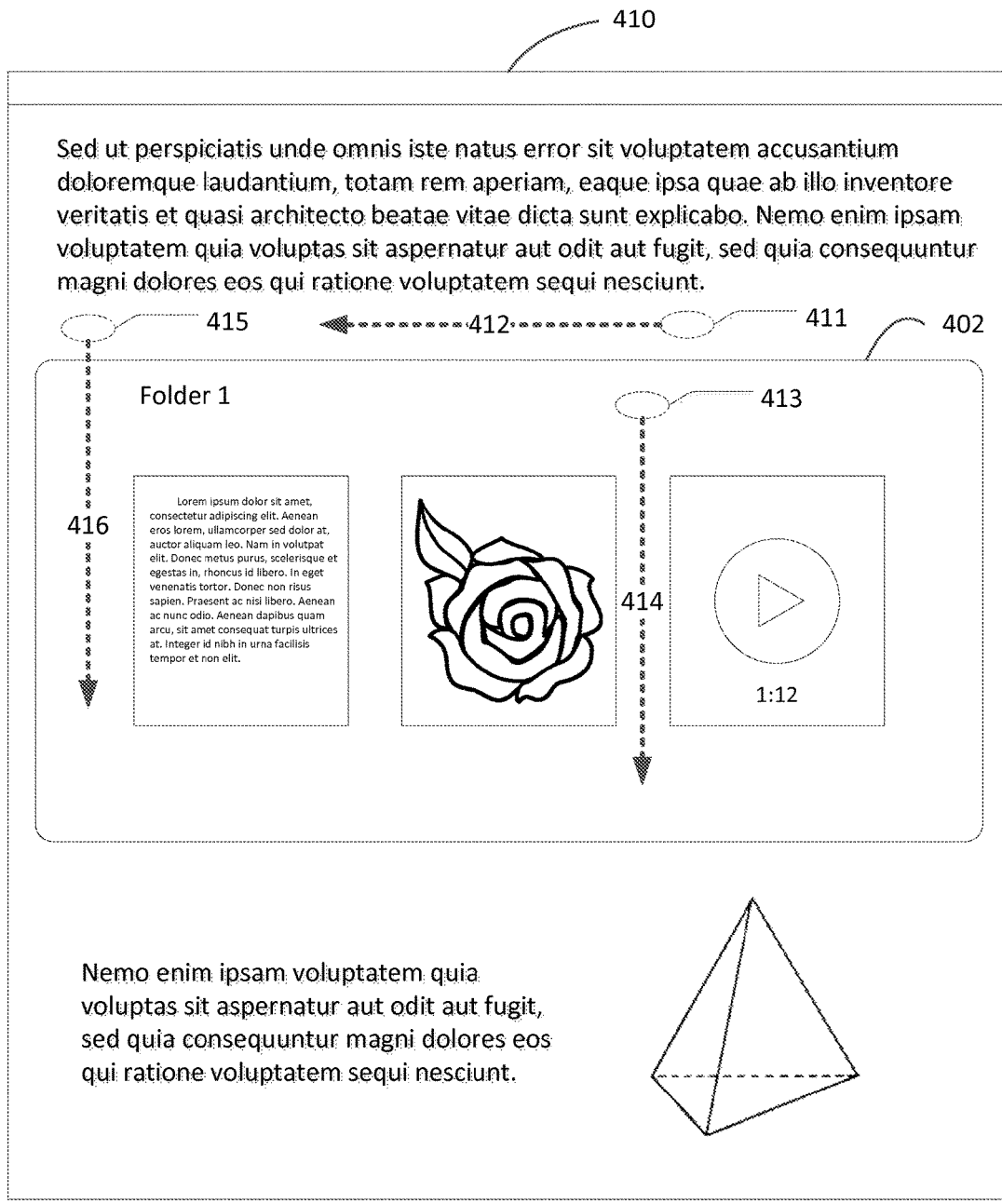

FIG. 4B illustrates an example of how scrolling inputs and input locations on the same folder preview result in scrolling operations. The dotted ovals in FIG. 4B indicate the input location of the scrolling input while the direction of the arrow indicates the direction of the scrolling input. In some embodiments, a vertical scrolling input 416, e.g., scrolling up or down, scrolls the document as a whole, while a horizontal scrolling input 412, e.g., scrolling left or right, scrolls the previews 406 in the preview region 402. Note that the scrolling pattern described above occurs irrespective of scrolling input locations 411 and 415. For example, in the case of scrolling input 412 the input location is outside of the preview region 402 yet scrolling input 412 may still function to scroll the preview 406 in preview region 402.

In other embodiments, the location of a scrolling input (horizontal or vertical) determines the scrolling operation. For example, a scrolling input outside of the preview region, such as scrolling input 416 at input location 415, operates to scroll the document as a whole, whereas a scrolling input inside of the preview region, such as scrolling input 414 at input location 413, operates to scroll the previews 406 in the preview region 402 despite being a vertical scrolling input. The previews in the preview region may also scroll horizontally in response to a vertical scrolling input within the preview region such as scrolling input 414 at scrolling location 413. Additionally, a horizontal scrolling input within the preview region 402 may also function to scroll the previews 406 in the preview region 402. By assigning scrolling inputs of differing direction or input location to operate on either the document as a whole or the preview interface the preview application enables control of the preview interface separate from the document.

Figure 4C:
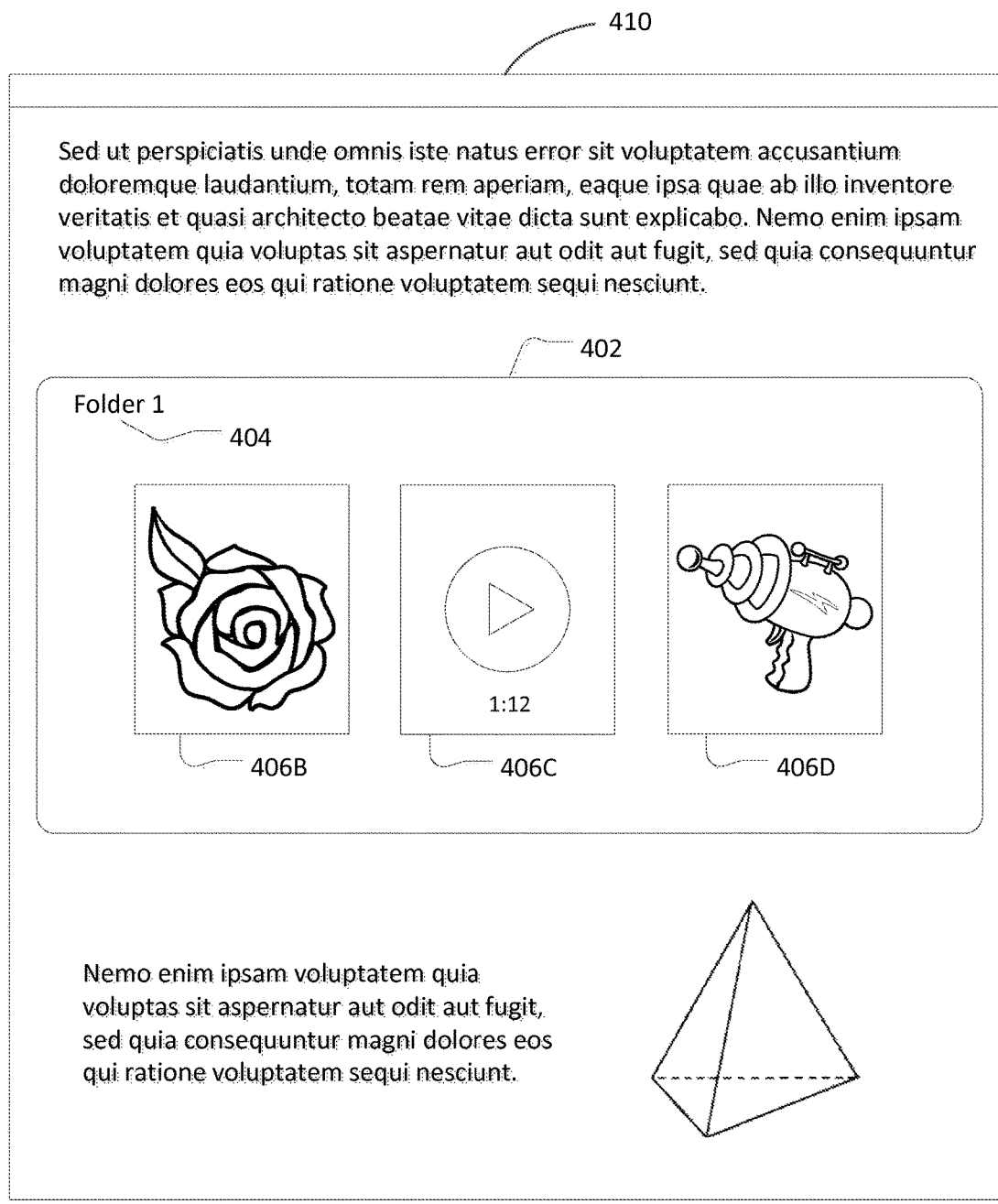

FIG. 4C illustrates the result of a scrolling input operating on the preview region 402. After the scrolling input is complete, each preview 406 is moved over one slot or position, while the rest of the document remains stationary. In response to a longer scrolling gesture the preview application may scroll the previews 406 in the preview region 402 over multiple slots. The folder preview displays previews 406B, 406C, and previously not displayed 406D, which is from the same folder as the other two previews. If there are no more previews 406 to scroll through the preview application may prevent the folder preview from scrolling in the same direction when the last preview 406 is within the folder preview region 402. Alternatively, the preview application may allow looping of previews such that, if there are no longer any previews 406 to view, the next preview 406 to enter the preview region is the first one to have been displayed in the preview region 402.

Figure 4D:
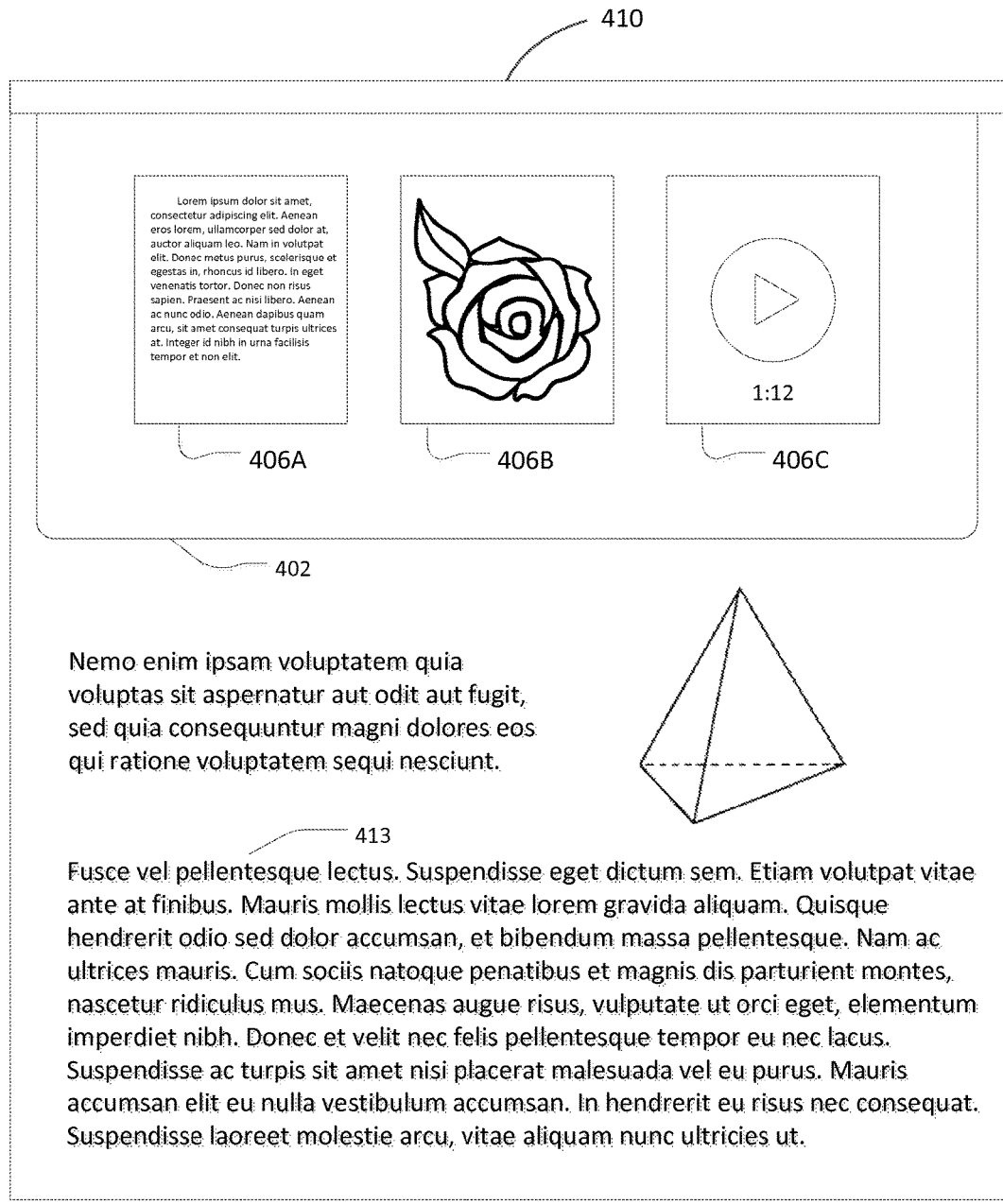

FIG. 4D illustrates the result of a scrolling input operating on the document 410 as a whole. After the scrolling input is complete, the entire document, including preview region 402, is scrolled in a vertical direction so that the preview application may display additional content, such as text 413. The previews 406 in the preview region 402 remain in the same relative positions as displayed in FIG. 4B.

Figure 5A:
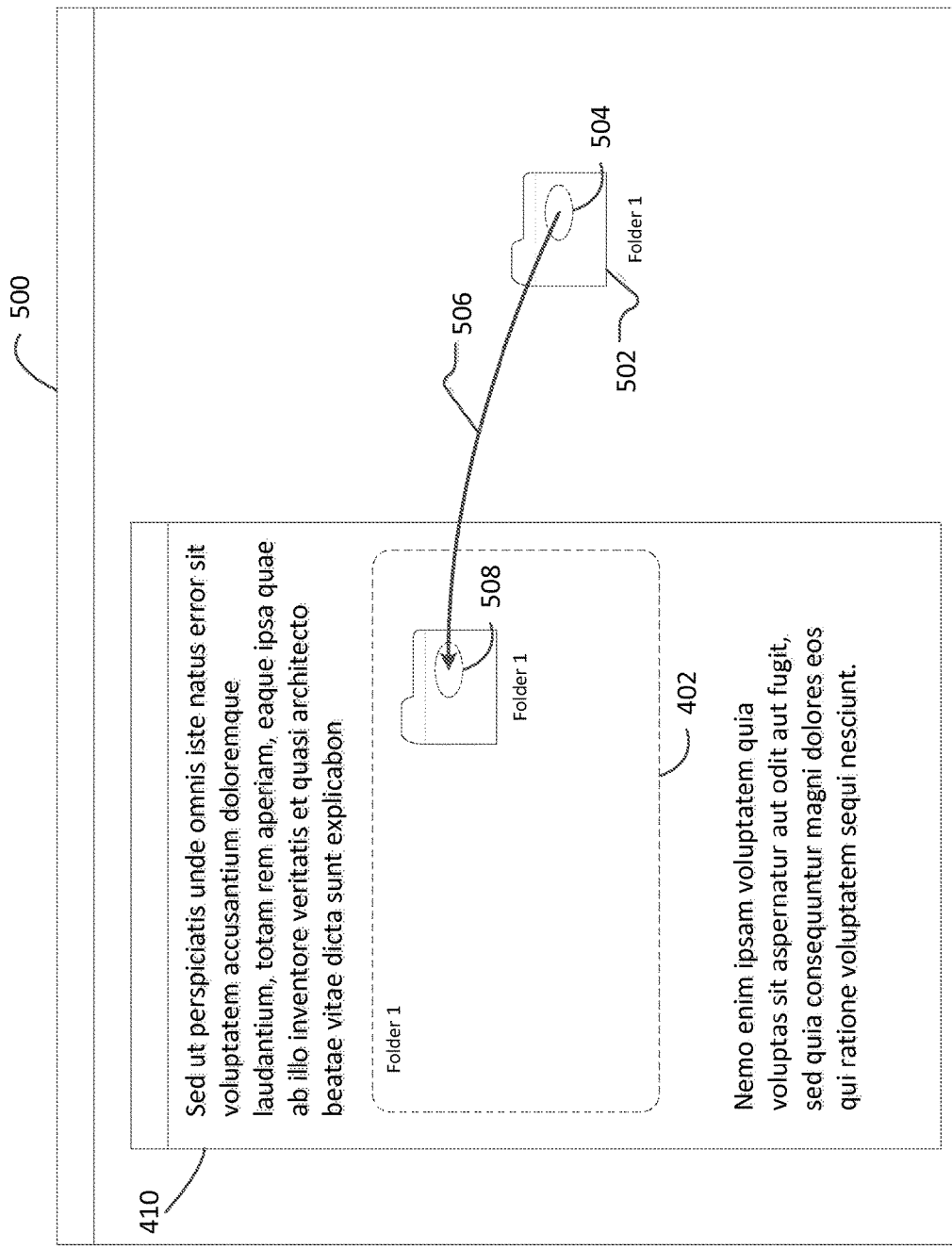
FIGS. 5A-5B illustrate user interface elements for creating a folder preview in a document in accordance with one embodiment.

FIG. 5A illustrates the process of creating a folder preview in a preview application window using a drag and drop series of commands. FIG. 5A illustrates a desktop or second application window 500, and a folder 502 along with previously identified elements from FIG. 4A.

The first step of the folder preview creation process is for the user to select and hold 504 a folder 502. Folder 502 may be any folder of the user including but not limited to a folder located on or synchronized with the content management system, a folder on a network device, a folder on the client device, or simply a selection of multiple content items. The user inputs a dragging gesture 506 until folder 502 is positioned over the document 410. Once the folder is positioned directly over the document 410, the user may release the folder 504 for immediate creation of a folder preview.

Upon release of the folder 502, a folder preview is created in the location of the preview application proximate to the release location 508. In some embodiments, the preview application may determine whether the folder is stored on the content management system. If the preview application determines that the folder 502 is not stored on the content management system, the preview application uploads the data corresponding to the folder 502 to synchronize the folder with the content management system including the content items within the folder, the internal file hierarchy of the folder and metadata for each content item in the folder including the content item size, file type, content item name, etc. In some embodiments, the preview application will prompt the user to allow an upload of the folder 502 to the content management system. In other embodiments, the upload process is started automatically. In some embodiments, the preview application will synchronize and create previews without uploading the folder 502 to the content management system. Instead the document itself is synchronized across users with access to the document. If another user attempts to access the content items represented by the previews 406 in the document, the content management system requests from the user whether they would like to share the folder 502 on the content management system. During the upload process, the content management system may also allow the user to determine the folder into which the folder 502 is saved on the content management system.

In some embodiments, holding the folder over the document 410 before releasing the folder causes the preview application to display the preview region to aid the user in placing the folder 502 into the document.

Figure 5B:
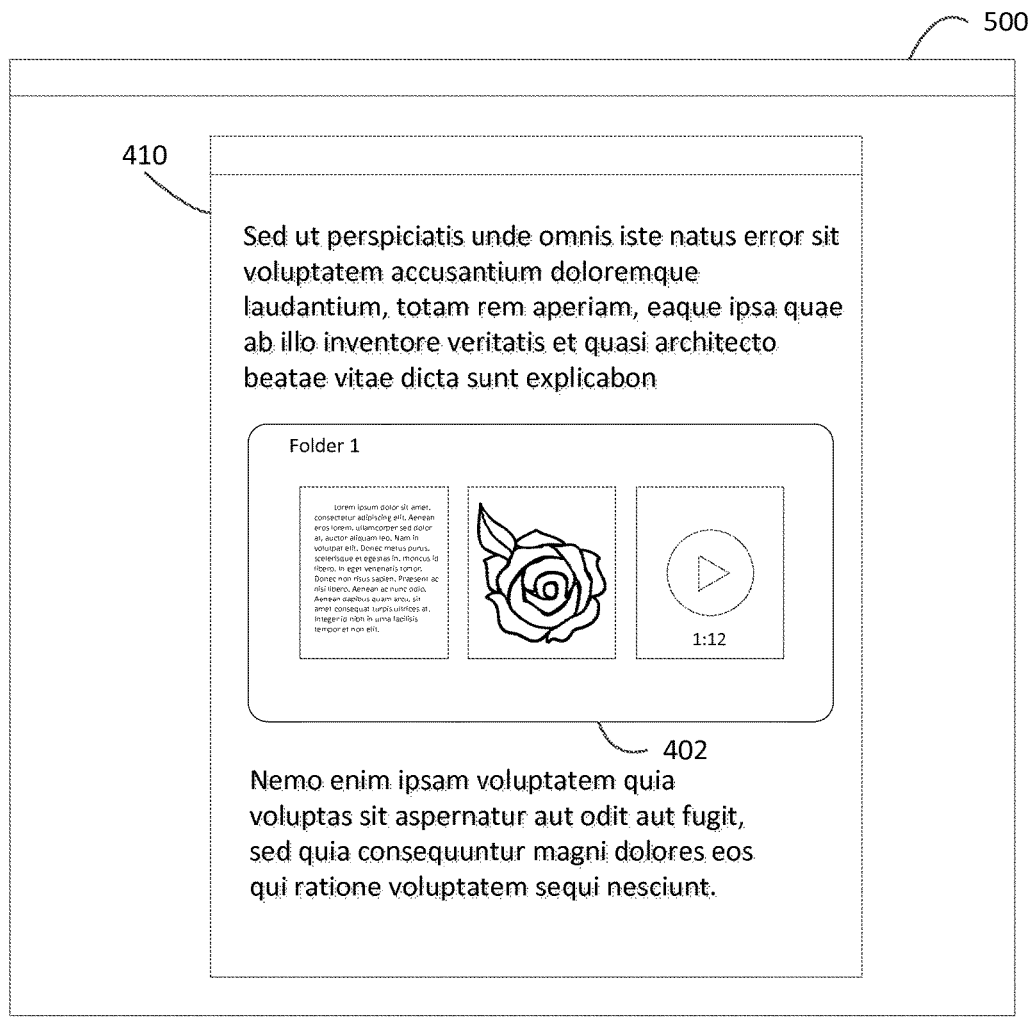

FIG. 5B illustrates the result of the click and drag process illustrated in FIG. 5A in accordance with one embodiment. The folder preview is placed in a location proximate to the release location 508.

Figure 6A:
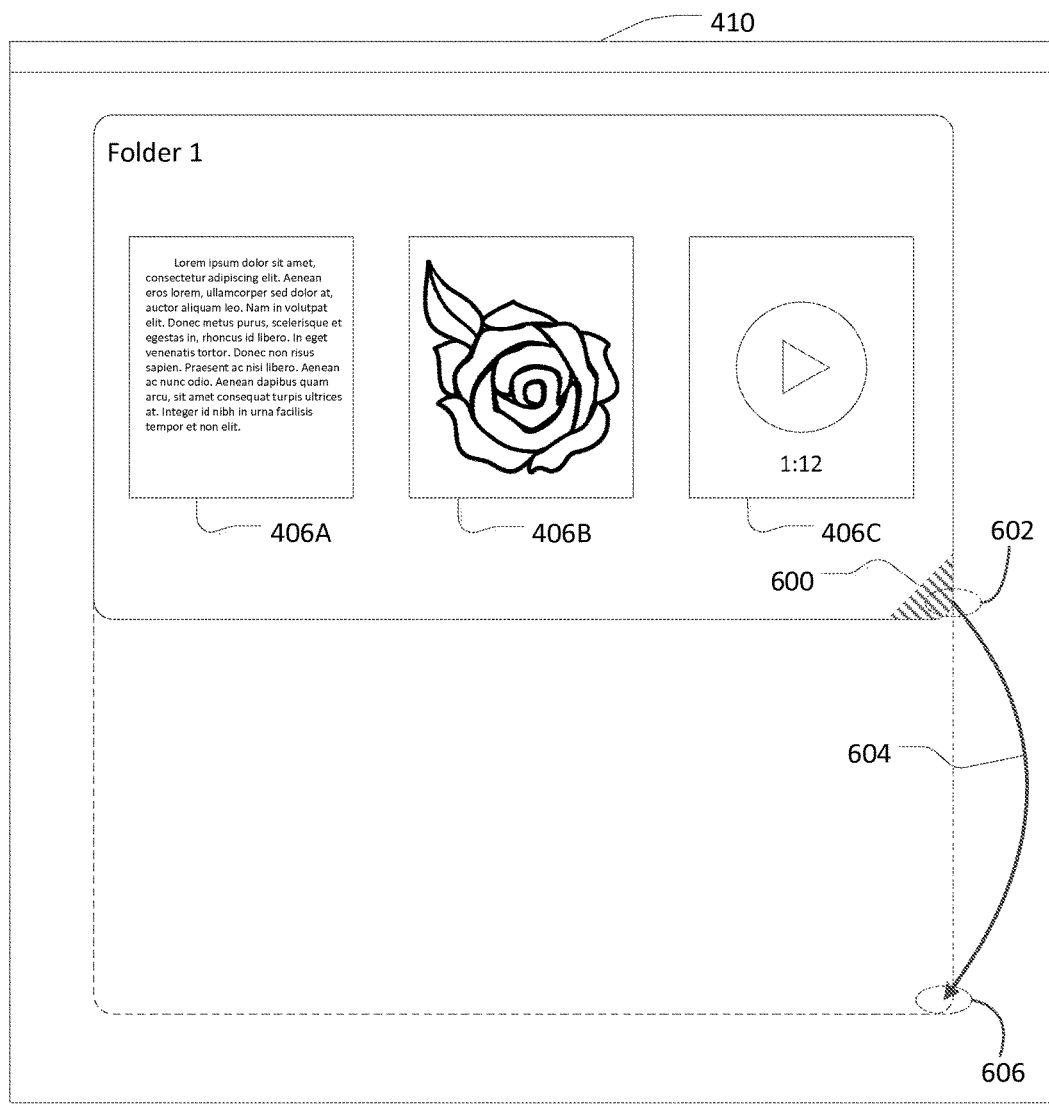
FIGS. 6A-6D illustrate user interface elements for resizing a folder preview region in accordance with one embodiment.

FIG. 6A illustrates user interface elements for resizing a folder preview region in a vertical or horizontal dimension in accordance with one embodiment. In some embodiments, the preview region 402 may have a resizing tab 600 in one or more of the corners. When the preview application receives a click and drag command on the resizing tab 600, the preview application resizes the folder preview region 402 of the folder preview by moving the corner with the resizing tab proximate to the release location of the click and drag command. This process is illustrated in FIG. 6A wherein a selection gesture is received at location 602, a dragging motion is received 604 from the selection location 602 to the release location 606, and the selection of the resizing tab 600 is released at the release location 606. The border of the preview region 402 may visibly follow the cursor or finger of the user as it moves from location 602 to location 606 as shown in FIG. 6A to give the user an indication for the appropriate release location 606.

Figure 6B:
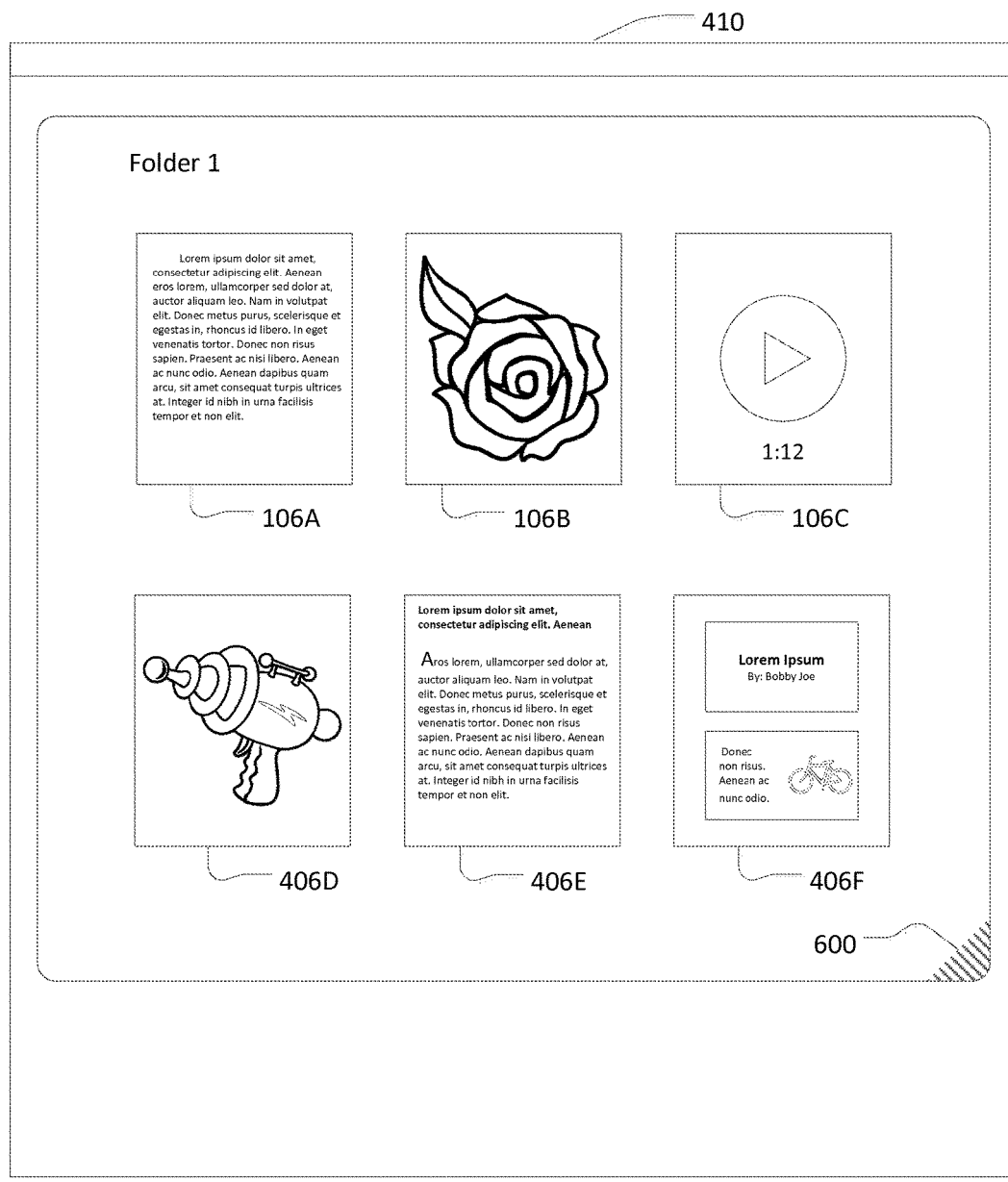

FIG. 6B illustrates the result of the process in FIG. 6A of increasing a vertical dimension of the preview region 402. The preview application determines the number of rows of previews 406 based on a threshold value of the vertical dimension in the preview region 402 per row. Each time the size of the preview region exceeds a multiple of that threshold value the number of rows in the folder preview is increased by one row. Likewise whenever the size of the preview region 402 is decreased, the number of rows may decrease. Because additional space is open in FIG. 6B in the preview region 402, additional preview 406D, 406E, and 406F can be displayed alongside the original preview 406A, 406B, and 406C.

Figure 6C:
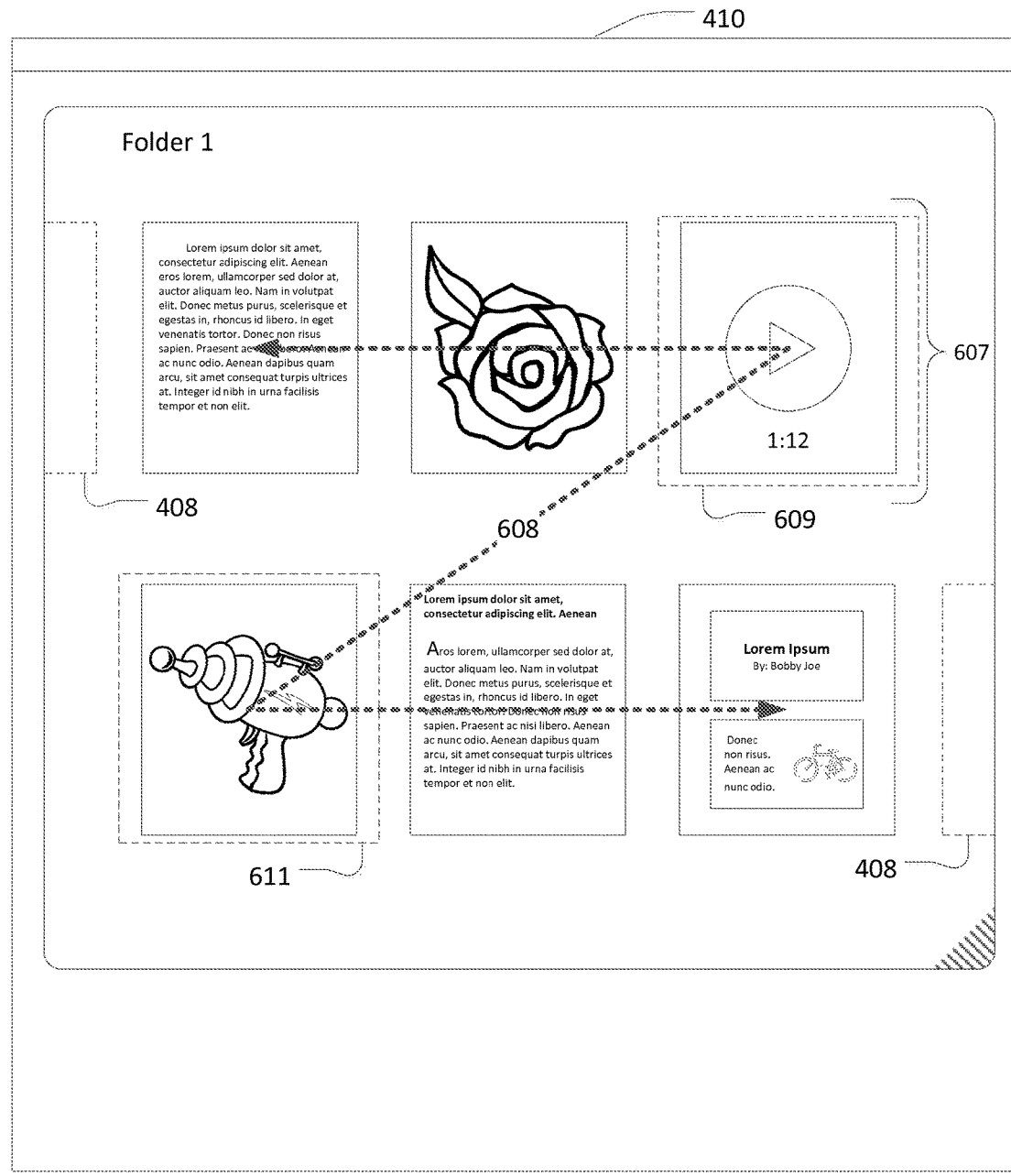

FIG. 6C illustrates a scrolling layout of a multi-row folder preview in accordance with one embodiment. Path 608 represents one potential path of the movement of previews 406 in response to receiving a scrolling command from the user, in the previews would be translated horizontally within a row 607 until an end position 609 is reached, and then shifted vertically to the opposing end 611 in a next row (downward) or previous (upward). In addition, scroll-in locations 408 show how the previews 406 would enter or leave the preview region 402 from opposing ends of the first and last row.

Figure 6D:
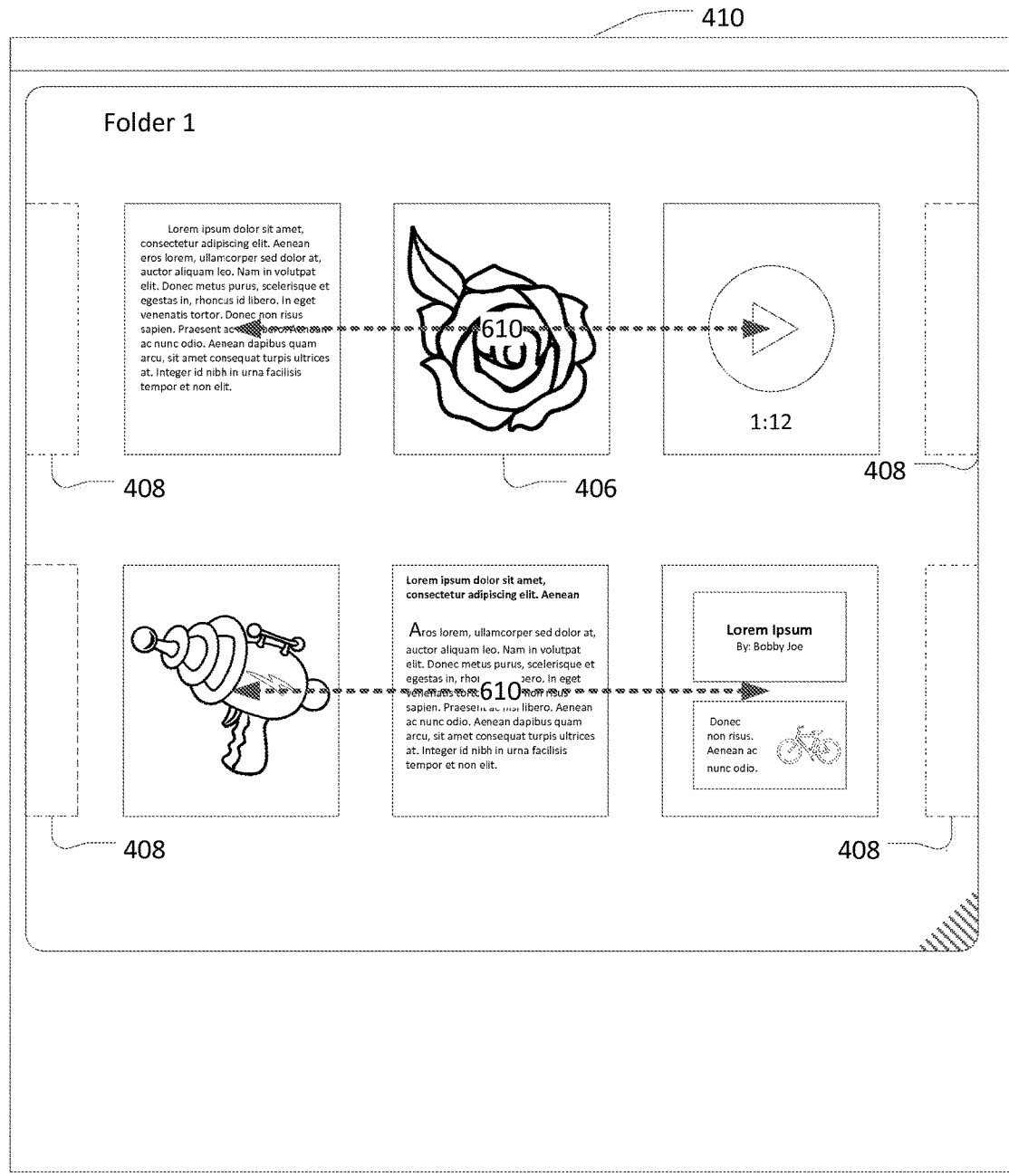

FIG. 6D illustrates an alternative scrolling layout of a multi-row folder preview in accordance with one embodiment. Paths 610 represent potential paths of previewed 406 in response to receiving a scrolling command from a user. Both rows of preview 406 may scroll at the same time in response to a scrolling command from the user or each row may scroll independently depending on the detected position of the received scroll input. Two sets of scroll-in locations 408 allow for each row to scroll horizontally.

FIG. 7A illustrates user interface elements for creating a subfolder preview in a preexisting folder preview interface. In addition to providing preview functionality, the preview application allows for changes in the organization of folder in the content management system from the document. Subfolders of "Folder 1" 404 may be added to Folder 1 or, if subfolders already exist, individual content items may be placed into the subfolder.

FIG. 7A shows the process of dragging and dropping a new folder 700 into the original folder 502. The user may select 702 the new folder 700, drag 704, and release 706 the folder over the preview region 402 to add the new folder 700 as a subfolder of folder 502. When the preview application receives these user actions the preview application modifies the location of folder 700 such that is now located within folder 502. In addition, the preview application notifies the underlying file system of the client device to create a subfolder 700 within folder 502 in the file system's directory; if the folders 502 are stored on the content management system 100, the preview application similarly notifies the system 100 to create the folder 700 there. The preview application may also allow a user to add a new content item to the existing folder 502 by dragging and dropping the content item. The process of adding a new content item is accomplished in substantially the same way and so is not shown explicitly. A folder 700 may also be created in a document 410 by selecting the folder in a file system or content management system, copying the folder, and then pasting the folder 700 into the document 410.

The preview application may allow for the removal of particular content items from folder 502 in an opposite series of user actions completed by dragging a content item preview 406 out of the folder preview region 402. The preview application may also allow the user to reorder the previews 406 by clicking and dragging a preview 406 from one area of the preview region 402 to another. Other operations such as copy and pasting or "saving as" may also be accomplished using alternative interactions with a content item or subfolder preview such as a right-click or two finger touch. The preview application notifies the file system of the client device and/or the content management system 100 to update their respective file directories to reflect the changes in the contents of the folder 502.

Figure 7B:
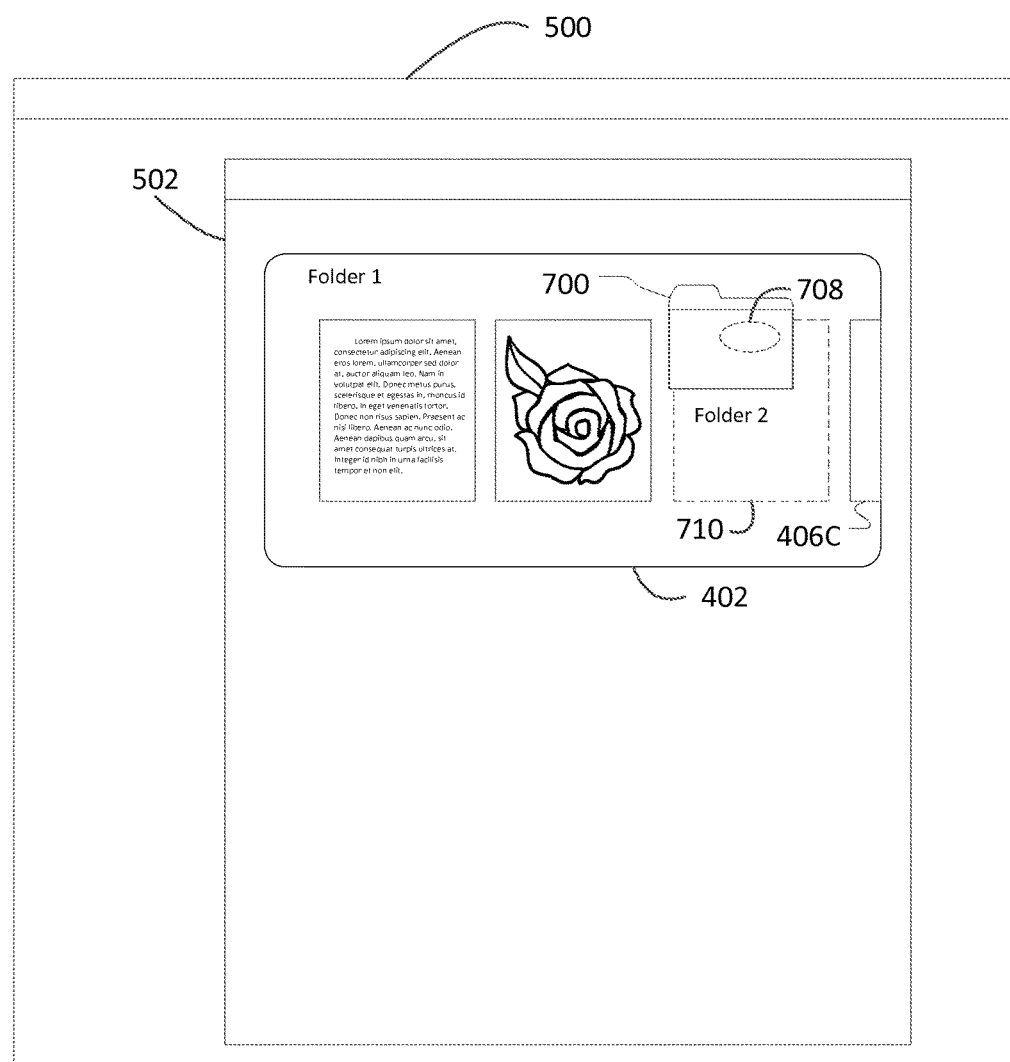

FIG. 7B illustrates another aspect of the user interface that enables the addition of the subfolder 700 into the preview interface. If the user holds 708 folder 700 over the preview region 402 the preview interface shows where the subfolder preview will be placed upon release of the original selection command 702. More specifically, the preview application translates preview 406C to the right to create a slot 710 for a new preview. A semi-transparent indication of the slot 710 for the new preview may be indicated in the folder preview interface.

Figure 7C:
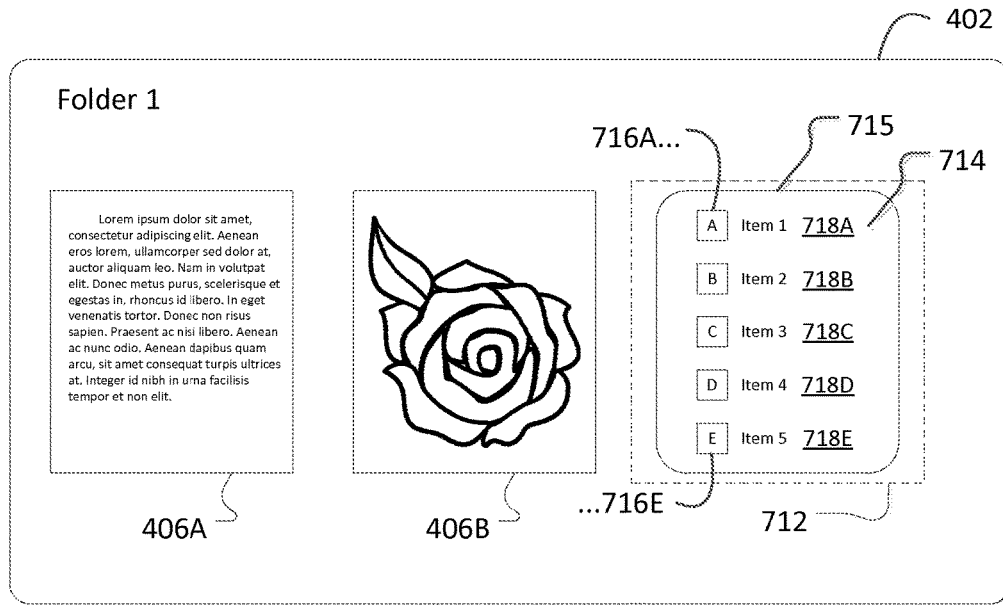

FIG. 7C illustrates a subfolder preview 712 resulting from the user adding subfolder 700 to Folder 1 in accordance with some embodiments. Like the folder preview region 402, the boundary 715 of subfolder preview region 714 may or may not be visible to the user but is used for spacing and interaction purposes. The subfolder preview 712 includes a scrollable list of content items 718A-718E within the folder. If more content items exist within subfolder 700 they are not in view until a vertical scrolling command is received from the user over the subfolder preview region 714. The list of sub-hierarchical content items 718A-718E is accompanied by application icons 716A-716E indicating the primary application associated with each content item. In some embodiments, these application icons are replaced by smaller previews. The presence of the subfolder preview 712 adds additional functionality to the folder preview interface. The user may click and drag previews 406 of content items located within folder 502 and release them into the subfolder preview region 714. As a result, the preview application will add the content item to folder 700 and the content item and corresponding preview 406 will be removed from its original location in folder 502.

Figure 7D:
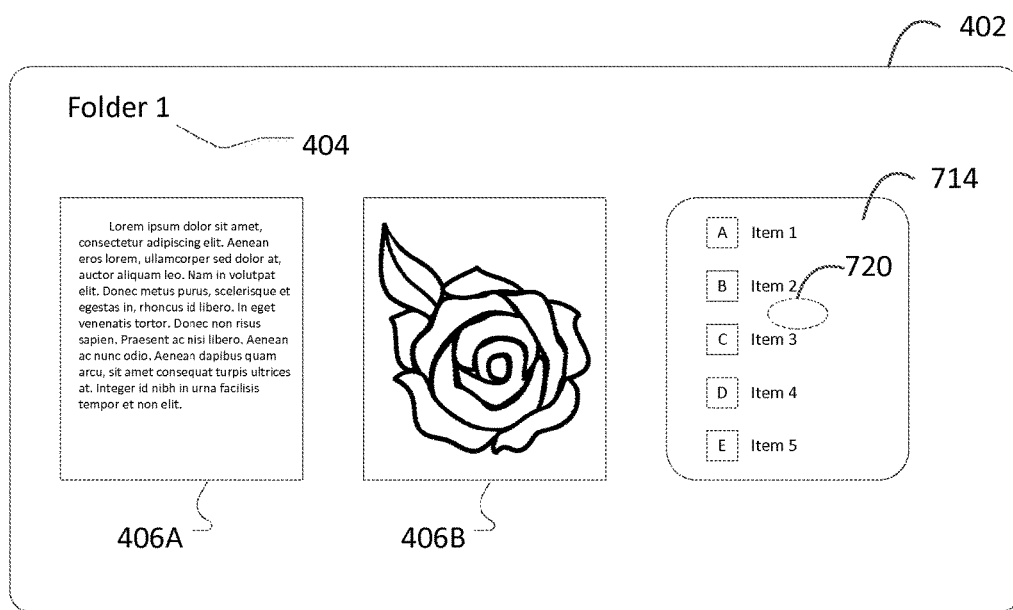

FIG. 7D illustrates the location of a user interaction 720 within subfolder preview region 714 to open subfolder 700 in the folder preview interface in accordance with one embodiment. The user may open a subfolder 700 such that it becomes the primary folder in the folder preview interface. This may be accomplished by a zoom-in command, a double click command, or any other type of secondary interaction.

Figure 7E:
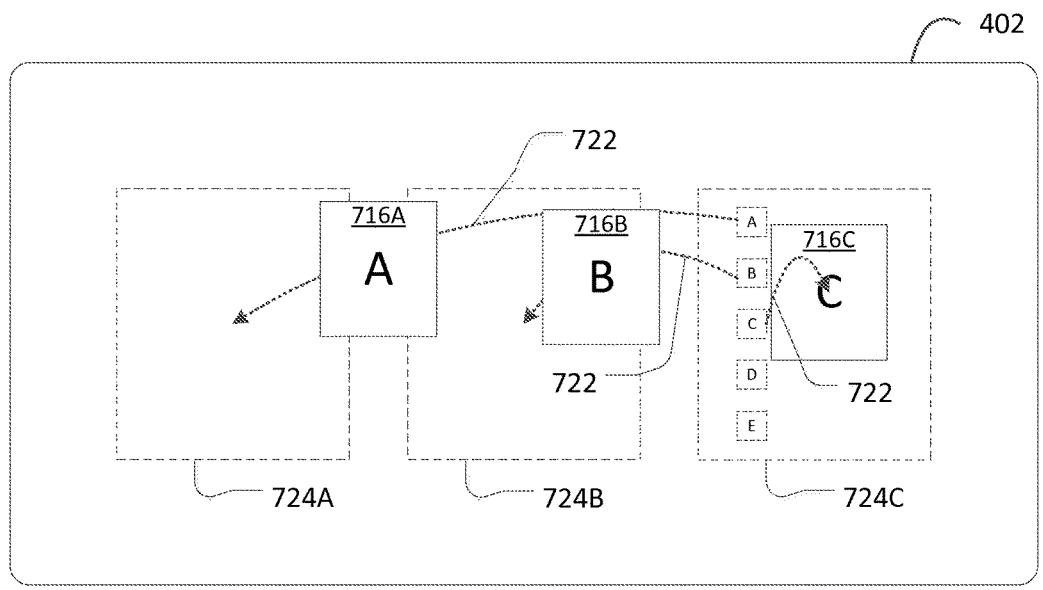

FIG. 7E illustrates the transition animation while opening subfolder 700 in the folder preview interface. Upon receiving an opening command from the user, the preview application initiates an animation to transition from folder 502 to folder 700. To animate the opening of the folder, the preview application selects a number of items in the folder corresponding to the number of slots 724 available in which previews may be fit (in this example, three previews 716A, 716B and 716C) and creates trajectories 722 for the icons of the items, to travel along to their respective positions 724A, 724B and 724C. The trajectories 722 are determined by tracing a curved or straight line from the original position of the content item icon 716 to the position of the preview that will correspond to content item 716. In some embodiments, the determined trajectory 722 may be arbitrarily curved for aesthetic purposes. As the content item icons 716 travel along their corresponding trajectories 722 the content item icons increase in size, approaching the size of a full content item preview 406. In some embodiments, the animation is timed such that when the content item icons 716 reach the end of the trajectories 722 the preview 406 for the content items selected for previewing have been generated allowing for a seamless display of the content item previews 406 once the content item icons 716 have reached the end of trajectories 722.

Figure 7F:
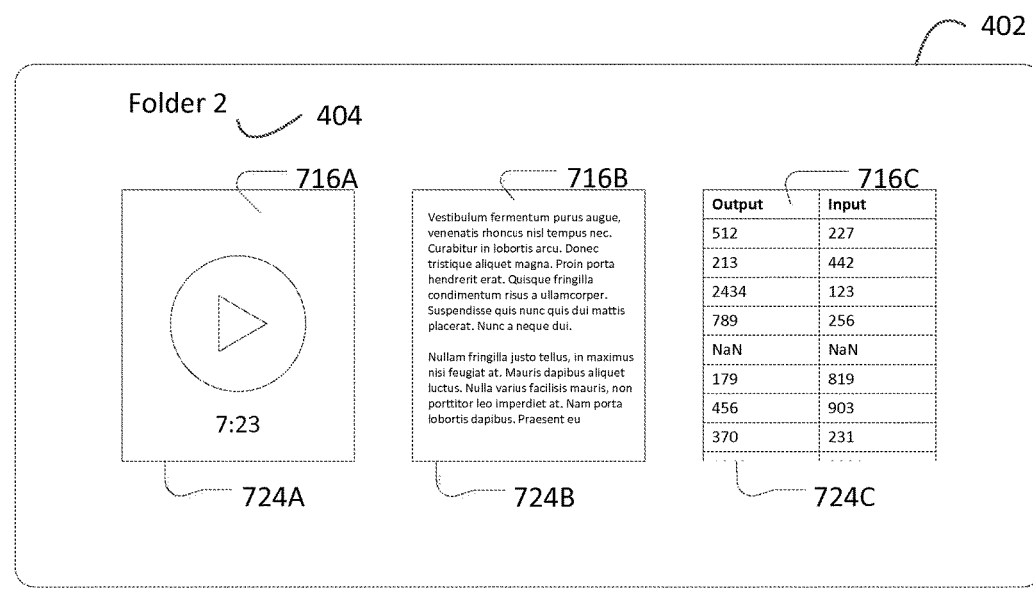

FIG. 7F illustrates the completed transition in the folder preview interface from folder 502 to subfolder 700. The folder preview interface now contains new content item previews corresponding slots 724A, 724B, and 724C corresponding to content item icons 716A, 716B, and 716C. In addition, folder name 404 has changed from "Folder 1" to "Folder 2" to indicate the change of folders. The preview application may allow the user to return to viewing the original folder 502 upon receiving a zoom-out command or another similar command.

Figure 8A:
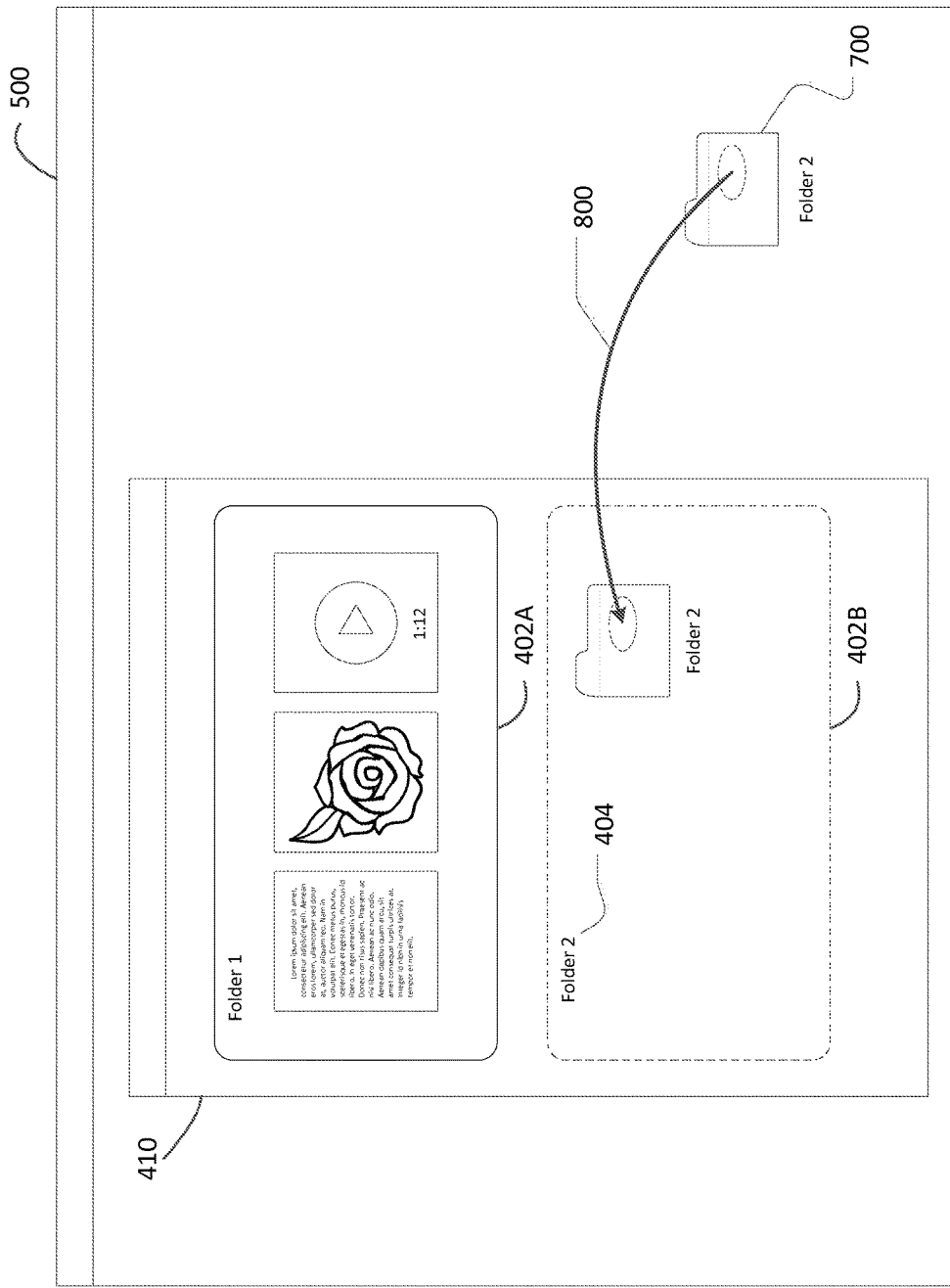

FIG. 8A illustrates a process of creating two folder preview interfaces within one document 410 in accordance with one embodiment. Similar to the process described for FIG. 5A, a user may add a second preview interface to a document by simply clicking and dragging 800 a second folder 700 into an area of the document below preview region 402A, or by copying and pasting. Similar to the process of FIG. 5A a semitransparent indication of the positioning of the second preview region 402B is shown within the preview application window 410.

FIG. 8B illustrates two folder preview interfaces within the same document. The second preview region 402B contains the content item preview 724A, 424C, and 724C. The user can interact with these two folder previews independently, for example independently scrolling within each folder preview.

Figure 8C:
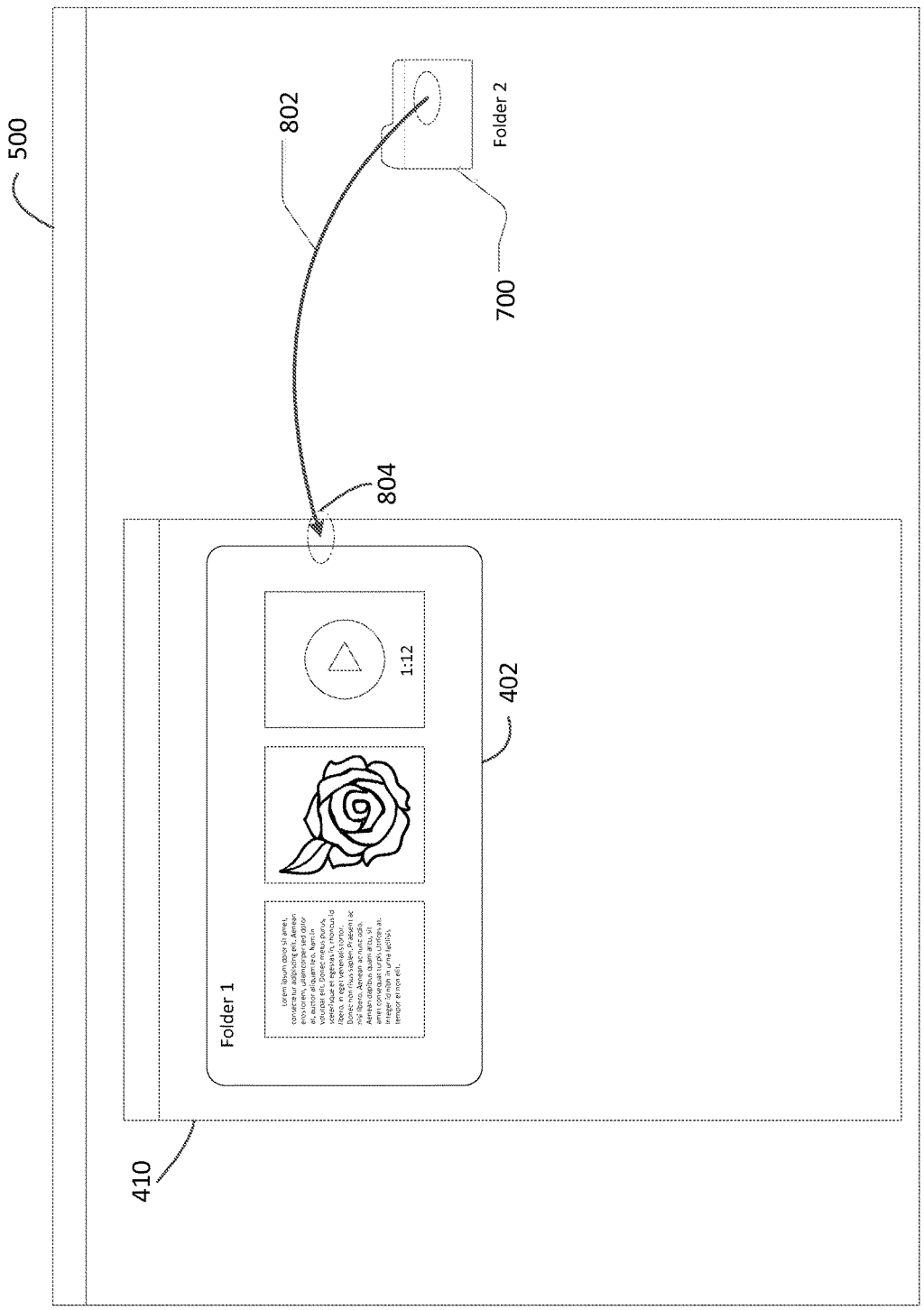
Figure 8D:
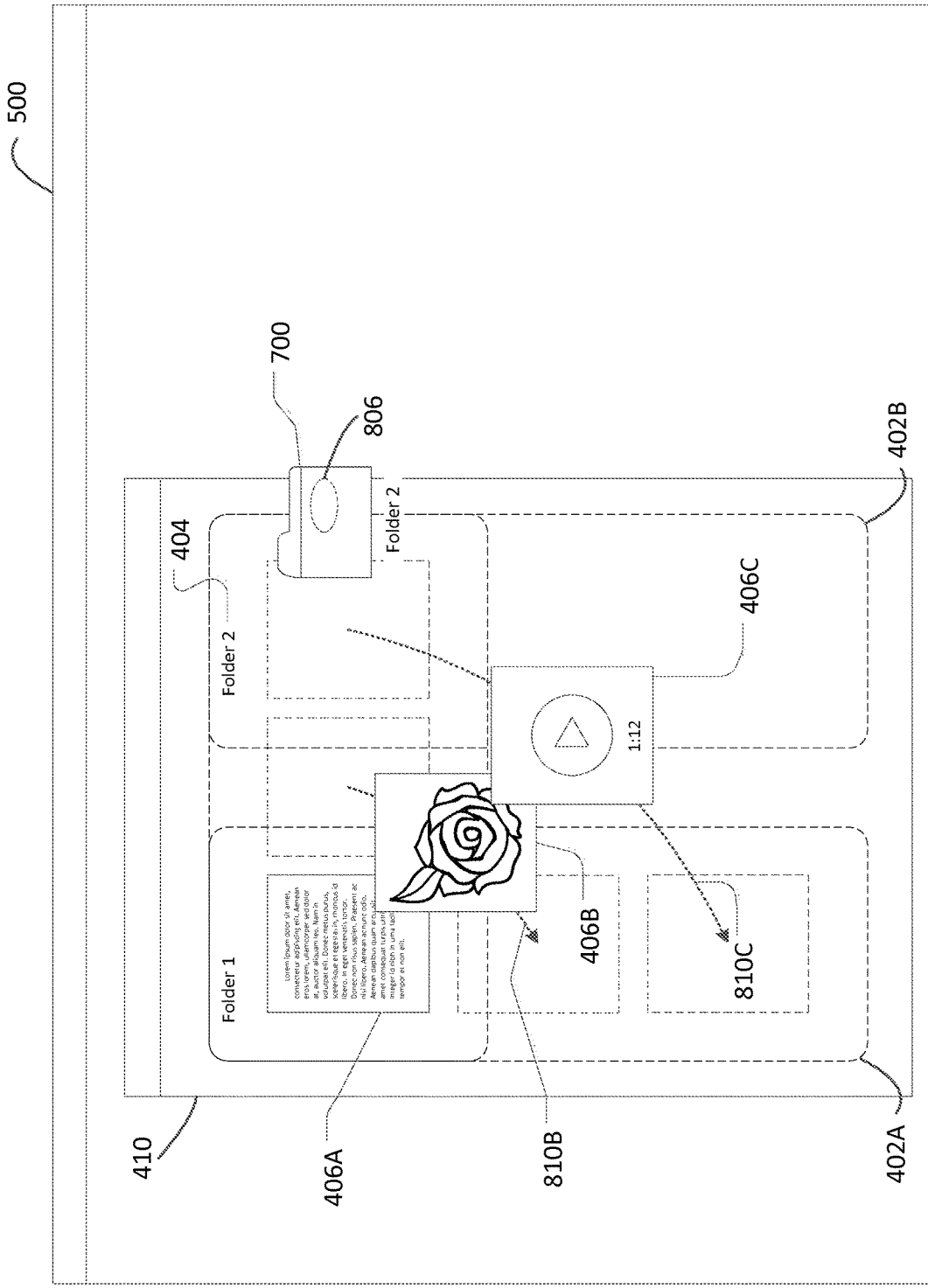
Figure 8E:
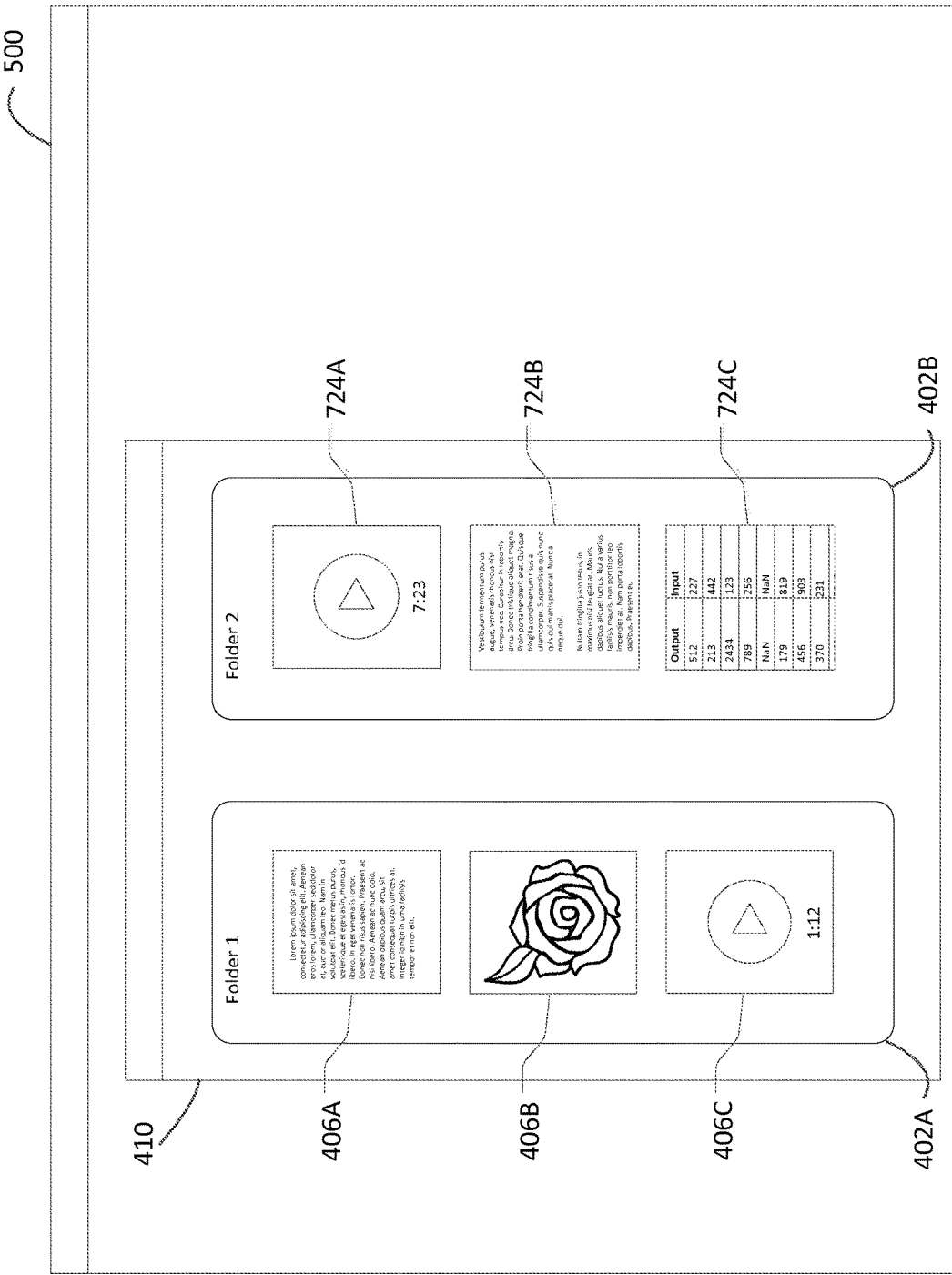
Figure 8F:
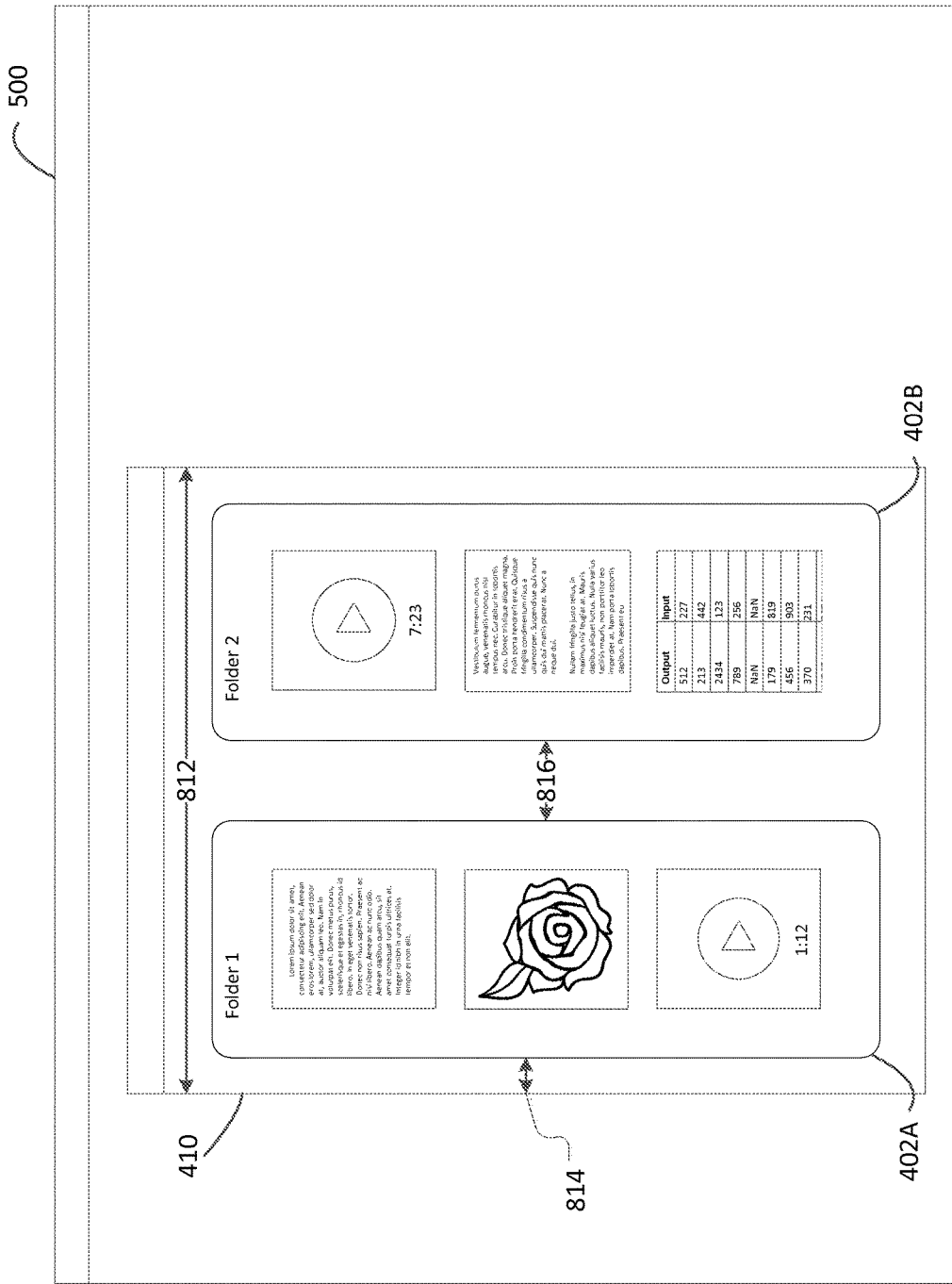

FIG. 8C illustrates an alternate process for creating two folder preview interfaces within one document 410 in accordance with one embodiment. If the preview application receives the same clicking and dragging commands 802, but instead the release location 804 is horizontally adjacent to the folder preview region 402 a different layout will result as is illustrated in FIGS. 8D-8F. FIG. 8D illustrates an animation resulting from a user holding 806 a new folder horizontally adjacent to a folder preview region 402 in accordance with one embodiment. In response to the user holding 806 a new folder 700 in a position horizontally adjacent to the folder preview region 402, the preview application resizes the folder preview region 402A into a vertical orientation and creates a second new folder preview region 402B, also in a vertical orientation, and arranges these two regions 402B side by side within the document 410. The preview application uses an animation to transition from the initial horizontal orientation of preview region 402 to its vertical orientation 402A. In one embodiment, the preview application generates a semi-transparent version of the preview region 402A in a vertical orientation, while at the presentation of the folder 402A in its horizontal orientation gradually fades away. Content item previews displaced by the change in orientation, in this case 406B and 406C, move along trajectories 810B and 810C to their new positions in the vertical orientation of preview region 402A. The transitional preview of the preview region 402A occurs in response to a command to hold 806 a folder horizontally adjacent to the original position of preview region 402A may be displayed or animated in a number of ways and this particular animation is exemplary but not limiting in any way.

FIG. 8E illustrates the document with two vertical preview regions 402A, 402B upon release of the folder in position 806 in accordance with one embodiment. When folder 700 is released into the preview application window 410 the preview application completes the transition. The result is two preview regions 402A and 402B being vertically oriented and adjacent to one another. The positions of the folder preview regions are persistent upon saving the document. Thus, the combination of the resizing features and the orientation changing features provided by the preview application allows a user to create a folder preview topography such that text and other media can be saved in a more visually appealing or effectual format.

FIG. 8F illustrates spacing parameters stored by the preview application allowing for visually appealing spacing of adjacent features in a document in accordance with one embodiment. FIG. 8F illustrates three spacing parameters comprising the width 812 of the application window, the margin buffer 814, and the inside buffer 816. The margin buffer 814 is the distance between the margin and the first folder preview region 402 while the inside buffer 816 is the distance between adjacent folder preview regions 402 or between a folder preview region and other content.

Based on the geometry illustrated in FIG. 8F the following relation is used by the preview application to calculate the appropriate width of a number n preview regions 402.

$$\frac{w_D - 2b_M - nb_I}{n+1}$$

Where $w_D$ is a width of the display window, $b_M$ is a width of a margin buffer, and $b_I$ is a width of an inside buffer.

This relation may also be used to determine spacing and sizing of columns of text and other media if they are placed adjacent to a folder preview region. If text or other media is adjacent to a folder preview region 402 text may be treated as one preview region or as multiple. For example, based on user specification a text column may count as 2 towards the number n or 1 based on a user's desired size of the text column.

What is claimed is:

1. A computer-implemented method comprising:
   detecting a request on a client device to embed a preview region including content item previews corresponding to content items included in a folder within a document displayed on the client device, the document having visible document content, wherein the content item previews are synchronized with the content items included in the folder in a content management system, each content item preview including a portion of visible content of a corresponding content item displayed within the content item preview;
   displaying, within the preview region, a subset of content item previews;
   in response to receiving a vertical scrolling input, scrolling the document content, including the preview region, in a vertical direction; and
   in response to receiving a horizontal scrolling input, irrespective of a location of the received horizontal scrolling input:
      scrolling out of the preview region a number of the content item previews; and
      scrolling into the preview region additional content item previews without scrolling the document.

2. The method of claim 1, wherein the preview region includes a semitransparent border within the document.

3. The method of claim 1 further comprising:
   adding a new content item to the folder;
   responsive to the new content item being added to a portion of the folder displayed within the preview region, displaying a content item preview corresponding to the new content item within the preview region.

4. The method of claim 3 further comprising:
   synchronizing the new content item with the content management system.

5. The method of claim 1 further comprising:
   detecting a change to a content item; and
   responsive to the changed content item corresponding to a content item preview displayed within the preview region, modifying the content item preview to reflect the change to the content item.

6. The method of claim 1 further comprising:
   removing a new content item from the folder;
   responsive to the removed content item corresponding to a content item preview displayed within the preview region, removing the content item preview from the preview region.

7. The method of claim 1, wherein a content item preview includes a portion of textual content of a corresponding content item.

8. The method of claim 1, wherein a content item preview includes a low resolution version of a corresponding content item image.

9. The method of claim 1, wherein a content item preview includes a thumbnail image of a corresponding content item video.

10. The method of claim 1, wherein a content item preview includes a number of spreadsheet fields of a corresponding content item spreadsheet.

11. The method of claim 1, wherein the preview region is located at a pre-designated location within the document.

12. The method of claim 1, further comprising receiving a request to move a location of the preview region within the document to a new location and, in response, embedding the preview region at the new location.

13. The method of claim 1, wherein the content item previews are generated in response to detecting the request to embed the preview region within the document.

14. The method of claim 1, wherein displaying the subset of content item previews comprises displaying content item previews corresponding to a set of most recently edited content items.

15. The method of claim 1 further comprising:
   displaying the subset of content item previews in at least one column within the preview region; and
   responsive to receiving a vertical scrolling input within the preview region:
      removing a number of content item previews from the preview region by vertically scrolling the number of content item previews out of the preview region; and
      vertically scrolling additional content item previews into the preview region.

16. The method of claim 1 further comprising:
   identifying one of the one or more content items as a subfolder, the subfolder storing sub-hierarchical content items;
   selecting a number of the sub-hierarchical content items for display in a subfolder preview;
   generating a subfolder preview of the identified subfolder, the subfolder preview comprising one or more content item icons arranged in a list, each icon representing one of the selected sub-hierarchical content items and each icon having accompanying text indicating a content item name; and displaying, within the preview region, the generated subfolder preview.

17. The method of claim 16 further comprising:
responsive to receiving a scrolling input over the subfolder preview within the preview region:
selecting an additional number of the sub-hierarchical content items for display in the subfolder preview;
removing a number of the sub-hierarchical content item icons from display in the preview region, the number equal to the additional number; and
displaying content item icons of the selected additional sub-hierarchical content items arranged in the list of the subfolder preview.

18. The method of claim 16 further comprising
responsive to receiving an input to zoom in over the subfolder preview within the preview region:
  generating previews of the sub-hierarchical content items of the subfolder represented by the subfolder preview;
  selecting a number of previews of the sub-hierarchical content items for previewing within the preview region;
  refreshing the display of preview in the preview region by displaying the selected previews of the sub-hierarchical content items within the preview region; and
  responsive to receiving a scrolling input within the preview region:
    selecting an additional number of previews from the sub-hierarchical content items in the subfolder;
    removing a number of previews from display in the preview region equal to the additional number; and
    displaying the selected additional previews of the sub-hierarchical previews in the preview region.

19. A computer system comprising:
a processor; and
a memory storing instructions that, when executed by the processor, cause the processor to perform steps comprising:
  detecting a request on a client device to embed a preview region including content item previews corresponding to content items included in a folder within a document displayed on the client device, the document having visible document content, wherein the content item previews are synchronized with the content items included in the folder in a content management system, each content item preview including a portion of visible content of a corresponding content item displayed within the content item preview;
  displaying, within the preview region, a subset of content item previews;
  in response to receiving a vertical scrolling input, scrolling the document content, including the preview region, in a vertical direction; and
  in response to receiving a horizontal scrolling input, irrespective of a location of the received horizontal scrolling input:
    scrolling out of the preview region a number of the content item previews; and
    scrolling into the preview region additional content item previews without scrolling the document.

20. A non-transitory computer readable storage medium storing instructions that, when executed by a processor causes the processor to perform steps of:
  detecting a request on a client device to embed a preview region including content item previews corresponding to content items included in a folder within a document displayed on the client device, the document having visible document content, wherein the content item previews are synchronized with the content items included in the folder in a content management system, each content item preview including a portion of visible content of a corresponding content item displayed within the content item preview;
  displaying, within the preview region, a subset of content item previews;
  in response to receiving a vertical scrolling input, scrolling the document content, including the preview region, in a vertical direction; and
  in response to receiving a horizontal scrolling input, irrespective of a location of the received horizontal scrolling input:
    scrolling out of the preview region a number of the content item previews; and
    scrolling into the preview region additional content item previews without scrolling the document.

* * * * *